(12) United States Patent
Khan et al.

(10) Patent No.: US 12,212,543 B2
(45) Date of Patent: Jan. 28, 2025

(54) BROWSER-LEVEL RUNTIME SUPPLY CHAIN SECURITY AND ATTACK DETECTION

(71) Applicant: Microsoft Technology Licensing, LLC, Redmond, WA (US)

(72) Inventors: Safwan Mahmud Khan, Woodinville, WA (US); Michael Hendrickx, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 519 days.

(21) Appl. No.: 17/497,452

(22) Filed: Oct. 8, 2021

(65) Prior Publication Data

US 2023/0122784 A1    Apr. 20, 2023

(51) Int. Cl.
*H04L 9/40* (2022.01)

(52) U.S. Cl.
CPC ........ *H04L 63/0236* (2013.01); *H04L 63/101* (2013.01); *H04L 63/126* (2013.01); *H04L 63/1433* (2013.01); *H04L 63/1441* (2013.01)

(58) Field of Classification Search
CPC . H04L 63/0236; H04L 63/101; H04L 63/126; H04L 63/1433; H04L 63/1441
See application file for complete search history.

(56) References Cited

U.S. PATENT DOCUMENTS

| | | | | |
|---|---|---|---|---|
| 11,528,301 B1 * | 12/2022 | Saraf | ................... | G06F 21/62 |
| 11,757,914 B1 * | 9/2023 | Jakobsson | ............... | H04L 51/42 726/25 |
| 11,770,398 B1 * | 9/2023 | Erlingsson | .......... | G06F 16/3329 709/224 |
| 11,777,992 B1 * | 10/2023 | Cross | .................. | H04L 63/0876 726/5 |
| 11,818,156 B1 * | 11/2023 | Parikh | ................. | G06F 16/9537 |

(Continued)

OTHER PUBLICATIONS

"Content Security Policy (CSP)", Retrieved from: https://web.archive.org/web/20210908085423/https://developer.mozilla.org/en-US/docs/Web/HTTP/CSP, Sep. 8, 2021, 27 Pages.
"Content Security Policy Reference", Retrieved from: https://web.archive.org/web/20210902125014/https://content-security-policy.com/, Sep. 2, 2021, 10 Pages.
"Content-Security-Policy-Report-Only", Retrieved from: https://web.archive.org/web/20210806100310/https://developer.mozilla.org/en-US/docs/Web/HTTP/Headers/Content-Security-Policy-Report-Only, Aug. 6, 2021, 5 Pages.
"OWASP", Retrieved from: https://web.archive.org/web/20210828055015/https://owasp.org/www-project-top-ten/2017/, Aug. 28, 2021, 3 Pages.

(Continued)

*Primary Examiner* — Stephen T Gundry
(74) *Attorney, Agent, or Firm* — Weaver IP L.L.C.

(57) ABSTRACT

Methods, systems, apparatuses, and computer-readable storage mediums are described for enabling runtime supply chain security of web applications and the discovery of active malware attacks. For example, a server is configured to receive CSP-based data from browsers executing on various clients. Such data may be received via a browser extension or via a proxy between the web applications and the browsers. Using the CSP-based data, the server generates a database of supply chain inventory. The database specifies resources that are loaded for a particular web application, along with a location from where such resources are loaded. The database further specifies a chain of dependencies between such resources. The database is analyzed to determine whether any such resources have been compromised with malware or whether clients on which such resource have been loaded have been compromised with malware. Responsive to determining such cases, actions(s) may be performed to mitigate the malware.

20 Claims, 8 Drawing Sheets

(56) References Cited

U.S. PATENT DOCUMENTS

| | | | |
|---|---|---|---|
| 2016/0323309 A1* | 11/2016 | Sethi | H04L 63/1466 |
| 2018/0041530 A1 | 2/2018 | Tang et al. | |
| 2019/0238544 A1* | 8/2019 | Rajahram | H04L 63/101 |
| 2020/0358786 A1* | 11/2020 | Bergbom | H04L 63/20 |
| 2021/0014273 A1* | 1/2021 | Kipp | H04L 67/563 |
| 2022/0038468 A1* | 2/2022 | Jeevagunta | H04L 63/1425 |
| 2022/0272127 A1* | 8/2022 | Yawalkar | H04L 63/1433 |
| 2022/0345497 A1* | 10/2022 | Bhatkar | H04L 69/22 |
| 2023/0038796 A1* | 2/2023 | Bhatkar | H04L 63/1433 |
| 2023/0075355 A1* | 3/2023 | Twigg | H04L 67/306 |
| 2023/0254330 A1* | 8/2023 | Singh | G06F 11/323 726/23 |
| 2023/0259612 A1* | 8/2023 | Bhary | G06F 21/552 726/22 |
| 2023/0275916 A1* | 8/2023 | Moshitzky | H04L 63/145 726/24 |
| 2023/0275917 A1* | 8/2023 | Karmali | G06F 16/9537 709/224 |
| 2023/0328086 A1* | 10/2023 | Kapoor | H04L 63/1425 |
| 2023/0351026 A1* | 11/2023 | Cross | G06F 9/455 |

OTHER PUBLICATIONS

"Surface Family", Retrieved from: https://web.archive.org/web/20210909050442/https://www.microsoft.com/en-us/, Sep. 9, 2021, 3 Pages.

Shannessy, et al., "React", Retrieved from: https://github.com/facebook/react, Mar. 22, 2021, 4 Pages.

Calzavara, et al., "CCSP: Controlled Relaxation of Content Security Policies by Runtime Policy Composition", In Proceedings of the 26th USENIX Security Symposium, Aug. 16, 2017, pp. 695-712.

Chen, et al., "Detection and Prevention of Cross-site Scripting Attack with Combined Approaches", In Proceedings of International Conference on Electronics, Information, and Communication, Jan. 31, 2021, 5 Pages.

"International Search Report and Written Opinion Issued in PCT Application No. PCT/US22/044302", Mailed Date: Nov. 21, 2022, 13 Pages.

* cited by examiner

BROWSER-LEVEL RUNTIME SUPPLY CHAIN SECURITY AND ATTACK DETECTION

BACKGROUND

Modern web applications load several artifacts for their functionality. These artifacts include JavaScript source code files, images, cascading style sheets ("css files"), frames, web fonts, etc. These artifacts, for performance reasons, are often downloaded from external sources. Such artifacts may be prone to known vulnerabilities. This creates a significant security dependency on these sources. Thus, companies put in a large effort to ensure that the third-party dependencies for their web application are secure to use. However, such efforts are generally limited to static analysis (in which source code is scanned to find vulnerabilities) and platform-level dynamic/runtime analysis (in which machines are scanned to find vulnerable software installed thereon).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described herein for enabling runtime supply chain security of web applications and the discovery of active malware attacks. For example, a reporting server is configured to receive Content Security Policy (CSP)-based data from browser applications executing on various client devices. Using the CSP-based data, the reporting server generates a database of supply chain inventory. The database specifies resources that are loaded for a particular web application, along with a location from which such resources are loaded. The database further specifies a chain of dependencies between such resources. The database is analyzed to determine whether any such resources have been compromised with malware or whether devices on which such resource have been loaded have been compromised with malware. Responsive to determining such cases, one or more actions may be performed to mitigate the malware.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
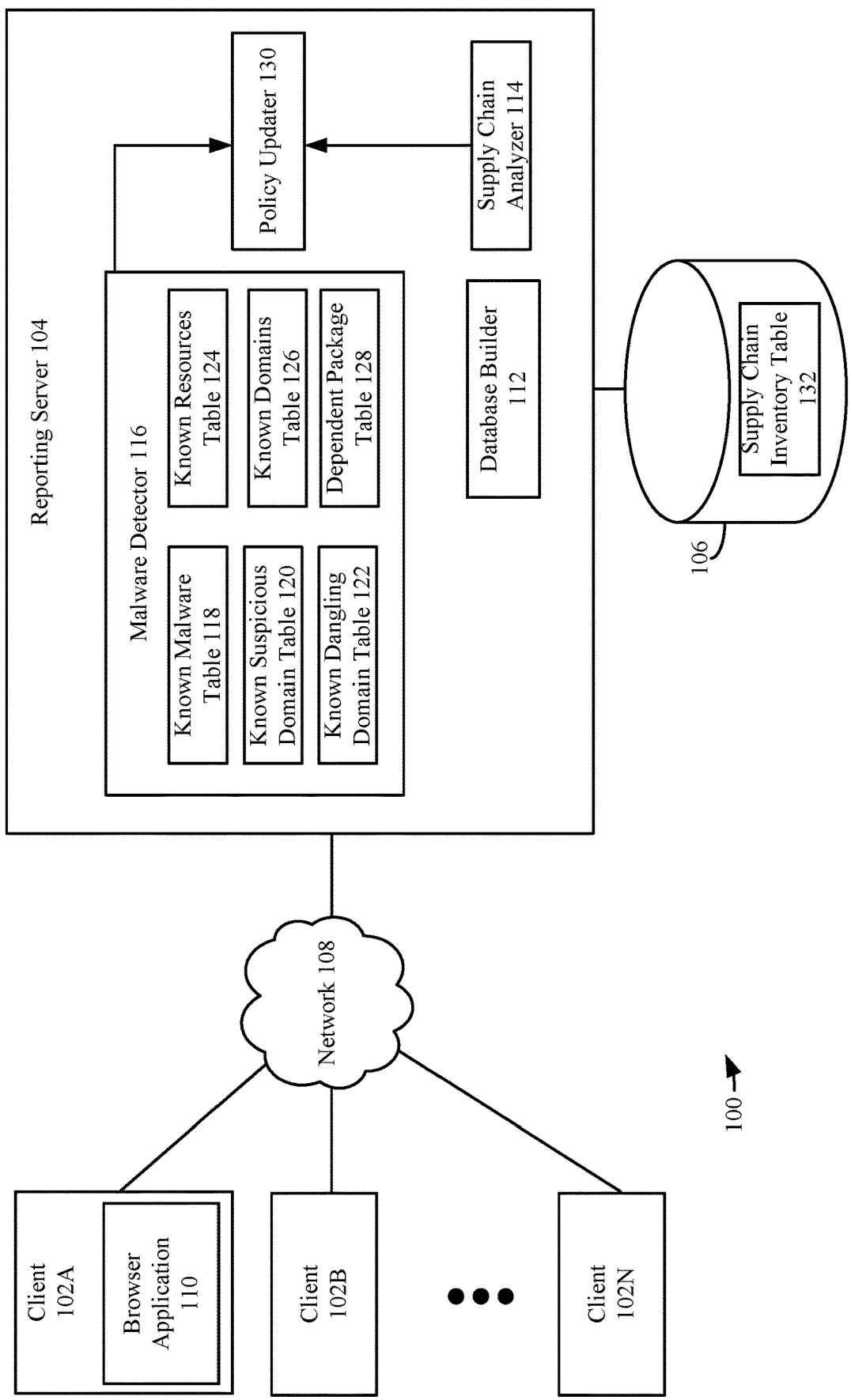
FIG. 1 shows a block diagram of a system for implementing browser-level supply chain security and attack detection in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, terms such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Within software security, the term "supply chain" often refers to data sources used during development and installations, such as build systems and external (open source) libraries. Industry-wide there is another security check in place for the data sources in the operating system (OS) or platform level. When web applications that reference external artifacts are deployed, companies should take their security posture into consideration as well, as this can be done very dynamically. For example, consider the following source code snippet hosted on service.contoso.com:

```
<html>
<head>
  <script src="//cdn.stayaway.net/boot.js"></script>
</head>
...
<html>
```

Questions arise as to whether "cdn.stayaway.net" is an application-owner approved content delivery network (CDN). If yes, then the associated script may be secure. If not, another question arises as to whether the CDN is controlled by an attacker. This is a big security concern.

Consider another case where boot.js is downloaded from an approved CDN:

```
<html>
<head>
  <script src="//cdn.safe.net/boot.js"></script>
</head>
...
<html>
```

The file "boot.js" referenced above may comprise the following code snippet:

```
var script=document.createElement('script');
script.setAttribute('src','//fabrikam.net/ai.js');
script.onload=callback( );
document.head.appendChild(script); ...
```

This snippet will allow //fabrikam.net/ai.js to have full document object model (DOM) access to service.contoso.com, which is the equivalent to an RCE (remote code execution) vulnerability within the browser application. In addition, each imported JavaScript source code file could load other files and execute, either through an eval( )-alike functionality, or rendering data in the DOM. This forms a chain of dependencies for which conventional techniques provide no coverage to detect.

Content Security Policy (CSP) is an established mechanism by which browser applications cooperate with web applications to load resource files on the client-side required for an application from application-approved origins only. CSP mitigates cross-site scripting (XSS), clickjacking and other code injection attacks resulting from execution of malicious content in the trusted web page context. CSP can operate both in block mode (which prevents such attacks) and report-only mode. CSP provides a standard method for website owners to declare approved origins of content that browsers should be allowed to load on that website—covered types are JavaScript, CSS, HTML frames, web workers, fonts, images, embeddable objects such as Java applets, ActiveX, audio and video files, and other HTML5 features. Typically, companies adopt CSP to mitigate XSS, along with other mechanisms such as output escaping and user input sanitization for the same purpose.

CSP-adopted web applications already ingest a paramount of data into a reporting server's database. This CSP data is leveraged to fine-tune adoption of CSP so that the web application (or the web site hosting the web application) is not functionally broken. The data is also analyzed on-demand (not constantly) to audit if certain attacks happen for which CSP is intended for (like Cross-Site Scripting (XSS), clickjacking, data injections, etc.). However, such data has yet to be used to analyze browser-level supply chain security of web applications. Thus, quite a number of potential, crucial active attacks remain undetected.

The embodiments described herein extend the usage of CSP-based data to enable runtime supply change security of web applications and to discover active malware attacks. For example, a reporting server is configured to receive CSP-based data from browser applications executing on various client devices. Using the CSP-based data, the reporting server generates a database of supply chain inventory. The database specifies resources that are loaded for a particular web application, along with a location from where such resources are loaded. The database further specifies a chain of dependencies between such resources. The database is analyzed to determine whether any such resources have been compromised with malware or whether devices on which such resource have been loaded have been compromised with malware. Responsive to determining such cases, one or more actions may be performed to mitigate the malware.

The techniques described herein provide several technical advantages. For instance, the devices on which malware-compromised resources may be loaded are protected from malware, and therefore, are able to operate more securely and efficiently (i.e., the device is protected from the detrimental effects of malware). In addition, by performing malware detection globally for a plurality of client devices via a reporting server rather than on the client device itself, company-wide attacks may be detected. Moreover, a number of computing resources (e.g., processor cycles, memory, and/or storage) are conserved on the client. This advantageously enables older and simpler computing devices with limited processing capability that are unable to run advanced anti-malware software to be protected from malware.

A. Browser-Level Supply Chain Security and Attack Detection

FIG. 1 shows a block diagram of a system 100 for implementing browser-level supply chain security and attack detection in accordance with an embodiment. As shown in FIG. 1, system 100 includes a plurality of clients 102A-102N, a reporting server 104, and one or more databases 106. Each of clients 102A-102N are communicatively coupled to reporting server 104 via a network 108. Reporting server 104 is communicatively coupled to databases via a local connection and/or network 108 and/or another network. As described herein, networks, such as network 108, may comprise one or more networks such as local area networks (LANs), wide area networks (WANs), enterprise networks, the Internet, etc., and may include one or more of wired and/or wireless portions. Database(s) 106 may comprise relationship databases; however, the embodiments described herein are not so limited. It is noted that while FIG. 1 shows reporting server 104 as a single server, reporting server 104 may comprise any number of servers.

Each of clients 102A-102N, reporting server 104 and/or database(s) 106 may be configured to implement a request-response protocol in which request messages are transmitted thereby and messages responsive to the request messages are received. In accordance with an embodiment, each of clients 102A-102N, reporting server 104 and database(s) 106 are configured to transmit hypertext transfer protocol (HTTP) requests and receive HTTP responses. For example, each of clients 102A-102N are configured to execute a browser application 110 (i.e., a Web browser) that is configured to transmit and receive such requests and responses. Only client 102A is shown as including browser application 110 for the sake of brevity. Browser application 110 enables network information resources to be retrieved, presented, and traversed. An information resource may be accessed by the browser application using a network address, such as a uniform resource identifier. Examples of information resources include web pages, web applications, images, videos, and other forms of content. Examples of a browser application 110 include Microsoft Edge®, published by Microsoft Corp. of Redmond, Washington, Mozilla Firefox®, published by Mozilla Corp. of Mountain View, California, Safari®, published by Apple Inc. of Cupertino, California, and Google® Chrome, published by Google Inc. of Mountain View, California.

It is noted that the request-response protocol described above are purely exemplary and that each of clients 102A-102N, reporting server 104, and database(s) 106 may be configured to implement and execute other request-response protocols.

Each of clients 102A-102N, via browser application 110, may access a web application hosted by a web server. The web application may utilize a number of dependent resources, any of which may be hosted via other web servers or other content delivery networks. Each of clients 102A-102N, via browser application 110, sends requests to such other web servers or content delivery network to retrieve such resources. Additional details regarding retrieving resources from web servers is described below in Subsection II.B.

Each of clients 102A-102N are configured to report the resources that are loaded by its respective browser application 110 for a particular web application to reporting server 104. Such information may be reported via a message, such as a HTTP POST request. The message is provided by browser application 110 responsive to detecting a response header in a response received by browser application 110. In accordance with an embodiment, the response header is a CSP-report-only header. Examples of resources include, but are not limited to, scripts (e.g., JavaScript scripts), IFRAME content, style sheets (e.g., Cascading Style Sheets), images, audio files, video files, web fonts, web workers, and/or embeddable objects, such as Java applets, ActiveX objects, etc. Each of clients 102A-102N be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer).

Reporting server 104 is configured to process incoming messages originating from clients 102A-102N via network 108. Reporting server 106 may analyze the messages of such requests to determine web application artifacts that are loaded for the web application along with a location from where the web application artifacts or resources are loaded.

A typical CSP header may look as follows:
Content-Security-Policy: upgrade-insecure-requests; frame-ancestors 'self' https://contoso.com
This particular header contains several directives indicating that all non-TLS (transport layer security) traffic should be upgraded to their HTTPS (hypertext transfer protocol secure) counterparts.

CSP has a report-only mode, indicated by the presence of the content-security-policy-report-only HTTP header. By specifying this HTTP header, compatible user agents (e.g., browser application 110) will send a violation message to a predefined endpoint (e.g., reporting server 104). This could be performed with both "report-to" and "report-uri" directives. For example:
Content-Security-Policy-Report-Only: default-src 'self'; report-uri our.csp.report.server
This header will cause browser application 110 to send a message including a report or body (e.g., a JavaScript Object Notation (JSON) body). A message may be sent by browser application 110 for each resource loaded thereby. An example of a JSON body is provided below:

```
{
    "csp-report": {
        "document-uri": "https://contoso.com/mypage.html",
        "referrer": " ",
        "blocked-uri": "https://cdn.fabrikam.com/admin/script.js",
        "violated-directive": "script-src cdn.contoso.com",
        "original-policy": "default-src 'none'; script-src cdn-.contoso.com; report-uri our.csp.report.server report-to groupname",
        "disposition": "report"
    }
}
```

The CSP-report-only response header and associated report(s) are typically used by web developers to experiment with policies by monitoring (but not enforcing their effects). Thus, the reports report violations that would have occurred if the policy was being enforced. In the example, shown above, the document-uri directive specifies the uniform resource identifier of a document (e.g., associated with a web application) in which the violation occurred. The blocked-uri directive specifies the uniform resource identifier of the resource that would have been blocked if the policy was being enforced. As shown in the example above, the blocked-uri not only specifies the uniform resource identifier of the resource (i.e., "https://cdn.fabrikam.com/admin"), but also the name and/or type of the resource (i.e., "script.js"). The document or web application specified via the document-uri directive is considered to be dependent on the resource specified by the blocked-uri directive, as the resource is to be downloaded and utilized for the web application. The "original-policy" field specifies the original policy. The report may also comprise a "script-sample" directive, which specifies the first 40 characters of the resource (e.g., an inline script, an event handler, or style sheet) that caused the violation.

Browser application 110 of each of clients 102A-102N may provide messages to reporting server 104 for each resource retrieved thereby. Based on the data provided in the body of such messages, a database builder 112 of reporting server 104 generates database(s) 106 that comprises a supply chain inventory of web applications. In particular, database(s) 106 may comprise a supply chain inventory table 132 having a plurality of columns and/or fields. The columns and/or fields may comprise a unique identifier field, a resource file consumer field, a consumer owner field, a resource file provider field, a resource file name (including the file's path) field, a resource file sample field, a resource file signature field, a resource file's chain dependencies field, an original CSP policy field, a date added field, a date last seen field, and a number of hits field. It is noted that supply chain inventory table 132 may comprise other fields that are not described herein for the sake of brevity.

The unique identifier field stores a hash of all concatenated field values for a specific row (except the unique identifier field itself, the data added field, the date last seen field, and the number of hits field). The hash is generated by database builder 112. Before inserting any new data into the table, database builder 112 ensures that there is no conflict with the determined unique identifier for the new row to be inserted. This serves as a primary key of the table. If database builder 112 detects a duplicate determined unique identifier, another row is not added for the unique identifier. Instead, database builder 112 increments the value stored in the number of hits field by 1, thereby indicating that the unique identifier (i.e., the resource) was previously seen in the past and also tracking how many times the particular resource has been in the past.

To populate the resource file consumer field, database builder 112 directly uses the information associated with the "document-uri" directive. This information informs which website (including its full path) is loading the resource of this particular row.

To populate the consumer owner field, database builder 112 may retrieve ownership information (e.g., application/ service identifier, email address, etc.) from a company metadata index associated with web application ownerships and store such ownership information in the consumer owner field. Database builder 112 may determine the company name from the uniform resource identifier specified in the "document-uri" directive.

To populate the resource file provider field, database builder 112 uses the uniform resource identifier specified by the "blocked-uri" directive. If the "blocked-uri" directive specifies the same origin specified by the "document-uri" directive, then database builder 112 truncates the full path and stores only the scheme, host, and port, as the "blocked-uri" field already provides the full path. However, if the uniform resource identifier specified by the "blocked-uri" directive is from a different origin than the one specified by the "document-uri", database builder 112 stores the scheme, host, and port without further processing.

To populate the resource file name field, database builder 112 uses the information specified by the "blocked-uri" and "document-uri" directives. If the uniform resource identifier specified by the "blocked-uri" directive has the same origin as the uniform resource identifier specified by the "document-uri" directive, the "blocked-uri" directive provides the full path, and database builder 112 truncates and stores only the full path of the uniform resource identifier, which contains the file name at the end of the full path. If the uniform resource identifier specified by the "blocked-uri" directive is from a different origin than uniform resource identifier specified by the "document-uri," then only the scheme, host, and port (referred collectively as the "domain") are provided. In such a scenario, database builder 112 may retrieve and parse the resource specified by the "document-uri" directive to detect all uses of the "domain" and identify all the file names and paths specified in that resource. For each resource, database builder 112 generates a separate row in the inventory table.

To populate the resource file sample field, database builder 112 utilizes the information from the "script-sample" directive. This directive contains the first 40 characters of a resource; in particular a script. Database builder 112 stores these characters in the resource file sample field. In case the contents of the full resource are required, database builder 112 may download the resource utilizing the information stored in the resource file provider field and the resource file name field in that row of the table.

To populate the resource file signature field, database builder 112 leverages the data stored in the resource file provider field and the resource file name field in that row of the table. If this resource file was never encountered before, and therefore no entry exists in the table, database builder 112 downloads the resource utilizing the information stored in the resource file provider field and the resource file name field, calculates a cryptographic hash of the resource (e.g., using a SHA-256 algorithm or any other hash algorithm) of the resource, and stores the hashed value in the resource file signature field.

To populate the resource file's chain dependencies graph field, database builder 112 creates an association between unique identifiers that have dependencies with respect to each other. For instance, if resource A is loaded from a first provider, which in turn requires resource B to be loaded from another provider (and so on and so forth), a separate row (having its own unique identifier) is created for each resource. In the row generated for the resource A, database builder 112 associates the unique identifier of the resource A with the unique identifier of the resource B (e.g., A's unique identifier→B's unique identifier) in the resource file's chain dependencies graph field. If resource C is required to be loaded for resource B (and so on and so forth), database builder 112 further associates the unique identifiers of the resources A and B with the unique identifier of resource C (e.g., A's unique identifier→B's unique identifier→C's unique identifier). In this example, in the row generated for resource B, database builder 112 associate the unique identifier of resource B with the unique identifier of resource C (e.g., B's unique identifier→C's unique identifier). If there is no chain of dependencies for a given resource, then database builder 112 may store a default value (e.g., "N/A") in the resource file's chain dependencies graph field.

To populate the original CSP policy field, database builder 112 utilizes the policy specified by the "original-policy" directive.

To populate the data added field, database builder 112 utilizes the date on which the row for a resource was added to the table.

To populate the date last seen field, database builder 112 utilizes the date on which the corresponding resource was last loaded.

To populate the number of hits field, database builder 112 initially sets the value of this field to one (i.e., when the row is added). As described above, if database builder 112 detects a duplicate determined unique identifier, another row is not added for the unique identifier. Instead, database builder 112 increments the value stored in the number of hits field by 1, thereby indicating that that the unique identifier was previously seen in the past.

1. Supply Chain Analysis

As also shown in FIG. 1, reporting server 104 further comprises a supply chain analyzer 114. Supply chain analyzer 114 may maintain an allow list of approved resource providers. Supply chain analyzer 114 may be configured to periodically analyze supply chain inventory table 132 maintained by database(s) 106 and determine whether any resource included therein is associated with a resource provider that is not included in the allow list of approved providers. For instance, supply chain analyzer 114 may compare the provider information included in the resource file provider field in each row of supply chain inventory table 132 to the allow list of providers. For each resource, supply chain analyzer 114 may also compare the provider information associated with resources that are in the dependency chain for the resource (as specified in the resource file's chain dependencies graph field) to the allow list of providers. If the provider for a particular resource is not included in the allow list of approved providers, then supply chain analyzer 114 may perform an action to mitigate the usage of the resource, as such resource may comprise malware. For instance, supply chain analyzer 114 may cause an alert to be provided to the owner of publisher of the web application indicating that the web application utilizes a resource from an unknown provider. In another example, supply chain analyzer 114 may provide a notification to a policy updater 130 of reporting server 104. Policy updater 130 is configured to update a CSP policy such that resources from the unknown provider are blocked and/or provide the updated CSP policy to clients 102-102N for enforcement thereby.

Supply chain analyzer 114 may also be configured to receive security incident events or vulnerability updates that may specify that certain resources are comprised with malware. Responsive to receiving such events or updates, supply chain analyzer 114 may analyze supply chain inventory table 132 to determine whether such resources are included. In response to detecting such resources, supply chain analyzer 114 may perform an action to mitigate the usage of such resources as described above.

2. Active Attack Detection

Reporting server 104 may be further configured to detect active malware attacks. For instance, reporting server 104 may comprise a malware detector 116. Malware detector 116 may maintain a known malware table 118. Known malware table 118 may comprise a plurality of rows, each corresponding to different malware. Each row may comprise a malware file name field, a malware file content field, a malware file signature field, a description field, a collected from field, and a last updated field. Known malware table 118 may comprise other fields that are not described herein for the sake of brevity. The malware file name field specifies the name of the malware. The malware file content field may comprise the first 40 characters of the resource comprising the malware (e.g., a script), similar to the "script-sample" field of the report. The entire portion of the resource may be stored in a different location. The location (e.g., a uniform resource identifier) may also be specified in the malware file content field. The malware file signature field may comprise a signature of the resource. The collected from field specifies a uniform resource identifier at which the malware may be retrieved.

When a row is created for a loaded resource, malware detector 116 is configured to compare the signature stored in the resource file signature field of that resource in supply chain inventory table 132 to the signatures stored in each malware file signature field. If a match is found, then malware detector 116 determines that the loaded resource comprises malware. If no match is found, then malware detector 116 compares the data for the loaded resource stored in the resource file sample field of supply chain inventory table 132 (i.e., the first 40 characters of the loaded resource) to the data stored in each malware file content field of known malware table 118. If a match is found, then malware detector 116 retrieves (e.g., downloads) the resource via the uniform resource identifier stored in the resource file name field of supply chain inventory table 132 and the malware via the uniform resource identifier from the collected from field of known malware table 118. Malware detector 116 compares the contents of the retrieved resource and the contents of the retrieved malware file and determines how much of the contents thereof match. If a certain percentage of the contents matches (e.g., 80%), then malware detector 116 determines that the loaded resource comprises malware. In response to determining that the loaded resource comprises malware, malware detector 116 may perform an action to mitigate the usage of such resources, as described above. For instance, malware detector 116 may provide a notification to a policy updater 130 of reporting server 104. Policy updater 130 is configured to update a CSP policy such that problematic resources are blocked and/or provide the updated CSP policy to clients 102-102N for enforcement thereby. Malware detector 116 may also provide a notification to a user (e.g., an administrator, an owner of the web application, etc.) indicating that the user should fix the issue and/or should update a CSP policy. The notification may comprise an e-mail message, a short messaging service (SMS), a ticketing message (e.g., sent to an information technology (IT) incident management application), etc.

Malware detector 116 may be further configured to detect whether a resource is loaded from a suspicious domain. For instance, malware detector 116 may further maintain a known suspicious domain table 120. Known suspicious domain table 120 may comprise a plurality of rows, each corresponding to different domain known to be suspicious or have a bad reputation for providing malware-comprised resources. Each row may comprise a uniform resource identifier field, among other fields, which are not described herein for the sake of brevity. The uniform resource identifier field stores the uniform resource identifier (e.g., a uniform resource locator (URL)) of the suspicious domain.

When a row is created for a loaded resource, malware detector 116 is configured to compare the uniform resource identifier stored in the resource file provider field of the row created for the loaded resource in supply chain inventory table 132 to each uniform resource identifier stored in the uniform resource identifier fields of known suspicious domain table 120. If a match is found, then malware detector 116 determines that a resource was loaded from a suspicious domain, and in response, perform an action to mitigate the usage of such resources as described above.

Malware detector 116 may be further configured to detect whether a resource is loaded from a dangling domain. Dangling domains are created when a domain name system (DNS) record points to a resource that is no longer available.

Normally, such a record should be deleted. However, if it has not been deleted, it becomes a dangling domain and creates the possibility for subdomain takeover. To detect such domains, malware detector 116 may further maintain a known dangling domain table 122. Known dangling domain table 122 may comprise a plurality of rows, each corresponding to different dangling domain. Each row may comprise a uniform resource identifier field, among other fields, which are not described herein for the sake of brevity. The uniform resource identifier field stores the uniform resource identifier (e.g., a uniform resource locator (URL)) of the dangling domain.

When a row is created for a loaded resource, malware detector 116 is configured to compare the uniform resource identifier stored in the resource file provider field of the row created for the loaded resource in supply chain inventory table 132 to each uniform resource identifier stored in the uniform resource identifier fields of dangling domain table 122. If a match is found, then malware detector 116 determines that a resource was loaded from a dangling domain, and in response, perform an action to mitigate the usage of such resources as described above.

3. Potential Active Attack Detection

Malware detector 116 may be further configured to detect potential active malware attacks. For example, malware detector 116 may maintain a known resources table 124. Known resources table 124 may comprise a plurality of rows, each corresponding to a different resource that is known to be malware-free. Each row may comprise a resource name field, a resource content field, a resource signature field, and a collected from field. Known resources table 124 may comprise other fields that not described herein for the sake of brevity. The file name specifies the name of the resource. The file content field may comprise the first 40 characters of the resource (e.g., a script), similar to the "script-sample" field of a CSP-report-only report. The entire portion of the resource may be stored in a different location. The location (e.g., a uniform resource identifier) may also be specified in the resource content field. The resource file signature field may comprise a signature of the resource. Malware detector 116 may determine the signature of the resource by downloading the resource and calculating a cryptographic hash of the resource (e.g., using a SHA-256 algorithm or any other hash algorithm) of the resource. The collected from field specifies a uniform resource identifier at which the known resource may be retrieved.

When a row is created for a loaded resource, malware detector 116 is configured to compare the signature stored in the resource file signature field of that resource in supply chain inventory table 132 to the signatures stored in each file signature field of known resources table 124. If a match is found, then malware detector 116 may determine that the loaded resource does not comprise malware. If no match is found, then malware detector 116 compares the data for the loaded resource stored in the resource file sample field of supply chain inventory table 132 (i.e., the first 40 characters of the loaded resource) to the data stored in each file content field of known resources table 124. Malware detector 116 may further retrieve (e.g., download) the resource via the uniform resource identifier stored in the resource file name field of supply chain inventory table 132 and the known resources via the uniform resource identifiers from the collected from fields of known resources table 124. Malware detector 116 may compare the contents of the loaded resource and the contents of the retrieved known resources (in their entireties) and determine how much of the contents thereof match. If a certain percentage of the contents match (e.g., 80%), then malware detector 116 determines that the loaded resource does not comprise malware.

However, if no match is found, then malware detector 116 may determine the number of times that the resource was loaded in a given period of time (e.g., between either 1) the date on which the analysis is performed for the loaded resource or 2) the date stored in the date last seen field for the loaded resource in supply chain inventory table 132 and the date stored in the date added field for the resource in supply chain inventory table 132). For instance, malware detector 116 may retrieve the value stored in the number of hits field for the loaded resource in supply chain inventory table 132. Malware detector 116 may compare the retrieved value to a predetermined threshold. If the value exceeds the predetermined threshold (i.e., the resource has been loaded on a relatively high number of computing clients of clients 102A-102N), then malware detector 116 may determine that the loaded resource comprises malware and that a potential malware attack is in process or had occurred. In response, malware detector 116 may perform an action to mitigate the usage of such resources as described above.

Malware detector 116 may be further configured to detect whether a resource is loaded from a valid domain that is known to provide malware-free resources. For instance, malware detector 116 may further maintain a known domains table 126. Known domains table 126 may comprise a plurality of rows, each corresponding to a different domain known to provide malware-free resources. Each row may comprise a uniform resource identifier field, among other fields, which are not described herein for the sake of brevity. The uniform resource identifier field stores the uniform resource identifier (e.g., a uniform resource locator (URL)) of the domain.

When a row is created for a loaded resource, malware detector 116 is configured to compare the uniform resource identifier stored in the resource file provider field of the row created for the loaded resource in supply chain inventory table 132 to each uniform resource identifier stored in the uniform resource identifier fields of known domains table 126. If a match is found, then malware detector 116 determines that a resource was loaded from a valid domain. However, if no match is found, then malware detector 116 may determine the number of times that the resource was loaded in a given period of time (e.g., between either 1) the date on which the analysis is performed for the loaded resource or 2) the date stored in the date last seen field for the loaded resource in supply chain inventory table 132 and the date stored in the date added field for the resource in supply chain inventory table 132). For instance, malware detector 116 may retrieve the value stored in the number of hits field for the loaded resource in supply chain inventory table 132. Malware detector 116 may compare the retrieved value to a predetermined threshold. If the value exceeds the predetermined threshold (i.e., the resource has been loaded with a relatively high rate or such a domain provides resources files with a relatively high rate), then malware detector 116 may determine that the loaded resource was retrieved from a suspicious domain and determine that a potential malware attack is in process or had occurred. In response, malware detector 116 may perform an action to mitigate the usage of such resources as described above.

4. Integrity of Dependent Packages

Web applications consistently depend on third party components/packages/libraries for an enriched experience. Instead of building an inventory of such known packages, the inventory may be obtained from other teams. Usually, every company or organization has such info for code-level and platform-level dependency security issue-finding efforts. The embodiments described herein may also check the integrity of such dependent packages, but at the browser-level. For instance, as shown in FIG. 1, malware detector 116 may maintain a dependent package table 128. Dependent package table 128 may comprise a plurality of rows, each corresponding to a different package that is known to be malware-free. Each row may comprise a package name field, a package provider field, a package signature field, and a package version field. The package name field specifies the name of the package, the package provider field specifies the name of the provider of the package, the package signature field comprises a signature of the package. Malware detector 116 may determine the signature of the package by downloading the package and calculating a cryptographic hash of the package (e.g., using a SHA-256 algorithm or any other hash algorithm) of the resource. The package version field specifies the version of the package.

When a row is created for a loaded resource, malware detector 116 is configured to determine whether the resource is a package by analyzing the resource file name field of supply chain inventory table 132. Upon determining that the loaded resource is a package, malware detector 116 determines the package name, as specified in the resource file name field. Malware detector 116 may further determine the version information (e.g., a version number) of the package. For instance, in certain cases, the version information is included in the package name. However, in cases in which the version information is not included in the package name, malware detector 116 may download the resource (e.g., using the information specified in its resource file provider and resource file name fields) and parse the resource for the version information. Malware detector 116 also obtains the signature of the package from the resource file signature field.

Malware detector 116 utilizes the determined package name and/or the version of the package to obtain (e.g., lookup) the signature of the package from dependent package table 128. Malware detector 116 compares the determined signature to the signature obtained from the resource file signature. If the signatures match, then malware detector 116 determines that the package is an authentic package that can be used. Otherwise, malware detector 116 determines that the package may comprise known vulnerabilities and performs an action to mitigate the usage of the package, as described above.

5. Integrity of Non-Program Manager Managed Packages

It is a standard software practice to use package managers (PMs) to maintain the 3rd party dependencies over the life cycle of a web application. Unfortunately, in reality, this practice can be violated by adding hard-coded package dependencies which bypass the normal security checks of such dependencies. For example, consider the following code snippet:
<head>
<script src=https://contoso.com/scripts/jquery-3.5.1.js></script>
</head>
As shown above, jQuery version 3.5.1 is used during runtime regardless of whatever version is listed in a package configuration file (e.g., a packages.config or packages.json file), which is maintained by PMs and commonly checked by different security tools.

Another way is to include a package directly and statically within the code repository, as is demonstrated in the code snippet below:

<head>
<script src="jquery-3.5.1.js"></script>
</head>
For both ways of unmanaged package inclusion, database builder 112 captures such info from messages provided by clients 102A-102N and stores such information in supply chain inventory table 132. For the first scenario, a message may specify the resource file provider (i.e., Contoso) and the resource file name (including the path) (i.e., /scripts/jquery-3.5.1.js"). When receiving a message with such information, database builder 112 stores the resource file provider name in the resource file provider field and stores the resource file name and path in the resource file name field. For the second scenario, a message may not specify the resource file provider, but only the resource file name. In this case, only the resource file name (e.g., "jquery-3.5.1.js") is obtained from the message and stored in the resource file name field.

There are two security concerns at issue here. The first concern is when the version number of the package, that is listed by PMs in their configuration files, does not have any vulnerabilities, but the actual version utilized during runtime does have known vulnerabilities. The second concern is why a codebase is adding a package directly within the code. The maintenance of this package then becomes on the repository owner, which is manual and unmanageable by a program manager. To prevent these lapses in security, malware detector 116 may further retrieve (e.g., download) the package via the uniform resource identifier stored in the resource file name field of supply chain inventory table 132. Malware detector 116 may analyze (e.g., parse) the contents of the retrieved package and determine the version number thereof. Malware detector 116 compares the determined version number to version numbers specified in the package version fields of dependent package table 128. If malware detector 116 finds a match, then malware detector 116 may determine that the package is safe to use. Otherwise, malware detector 116 may determine that the package may comprise known vulnerabilities and performs an action to mitigate the usage of the package, as described above.

6. Methods for Detecting Malware Via CSP-Based Data

Figure 2:
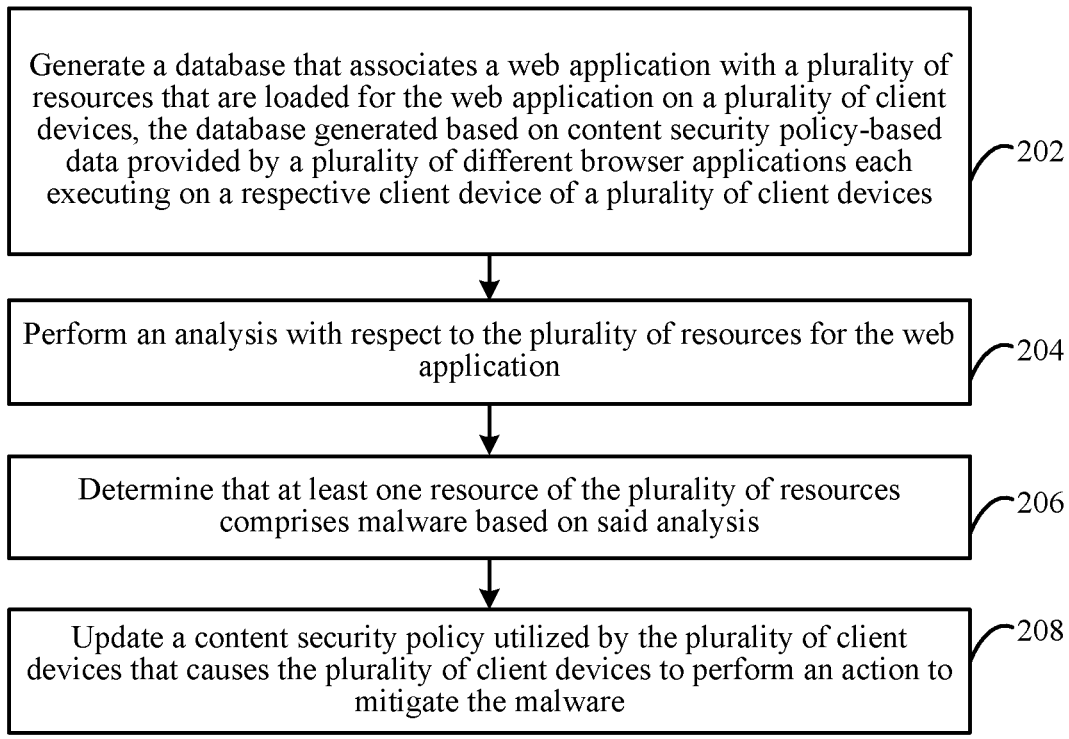
FIG. 2 shows a flowchart of a method for detecting malware utilizing content security policy-based data in accordance with another example embodiment.

Accordingly, malware detection may be performed utilizing CSP-based data in many ways. For example, FIG. 2 shows a flowchart 200 of a method for detecting malware utilizing CSP-based data, according to an example embodiment. In an embodiment, flowchart 200 may be implemented by reporting server 104, as described in FIG. 1. Accordingly, flowchart 200 will be described with continued reference to FIG. 1. Other structural and operational embodiments will be apparent to persons skilled in the relevant art(s) based on the following discussion regarding flowchart 200 and system 100 of FIG. 1.

Flowchart 200 of FIG. 2 begins with step 202. In step 202, a database is generated that associates a web application with a plurality of resources that are loaded for the web application on a plurality of client devices. The database is generated based on content security policy-based data provided by a plurality of different browser applications each executing on a respective client device of a plurality of client devices. For example, with reference to FIG. 1, database builder 112 is configured to generate database(s) 106. Database(s) 106 comprises supply chain inventory table 132 that associates a web application with a plurality of resources that are loaded for the web application on client device(s) 102A-102N. Database builder 112 generates database(s) 106 based on CSP-based data provide by browser application 110 executing on each of clients 102A-102N.

In accordance with one or more embodiments, each of the plurality of resources comprises at least one of a script, a cascading style sheet, an image, a web worker, an applet, an audio file, or a video file.

In step 204, an analysis is performed with respect to the plurality of resources for the web application. For example, with reference to FIG. 1, malware detector 116 of reporting server 104 performs an analysis with respect to the plurality of resources for the web application. Additional detail regarding analyzing resources is described below with reference to FIGS. 3-6.

In step 206, a determination is made that at least one resource of the plurality of resources comprises malware based on said analysis. For example, with reference to FIG. 1, malware detector 116 determines that at least one resource of the plurality of resources comprises malware based on said analysis. Additional detail regarding determining that a resource comprises malware is described below with reference to FIGS. 3-6.

In step 208, a content security policy utilized by the plurality of client devices that causes the plurality of client devices to perform an action to mitigate the malware is updated. For example, with reference to FIG. 1, upon detecting that at least one resource comprises malware, malware detector 116 provides a notification to policy updater 130. Policy updater 130 updates a content security policy, that when implemented by clients 102A-102N, cause clients 102A-102N to perform an action to mitigate the malware.

In accordance with one or more embodiments, the action performed to mitigate the malware comprises blocking the retrieval of a resource of the plurality of resources that is determined to comprise malware. For example, clients 102A-102N may receive a response from a web server to download a resource. If the content security policy implemented by clients 102A-102N specifies that such a resource should not be retrieved, then browser application 110 of clients 102A-102N will not retrieve the resource.

Figure 3:
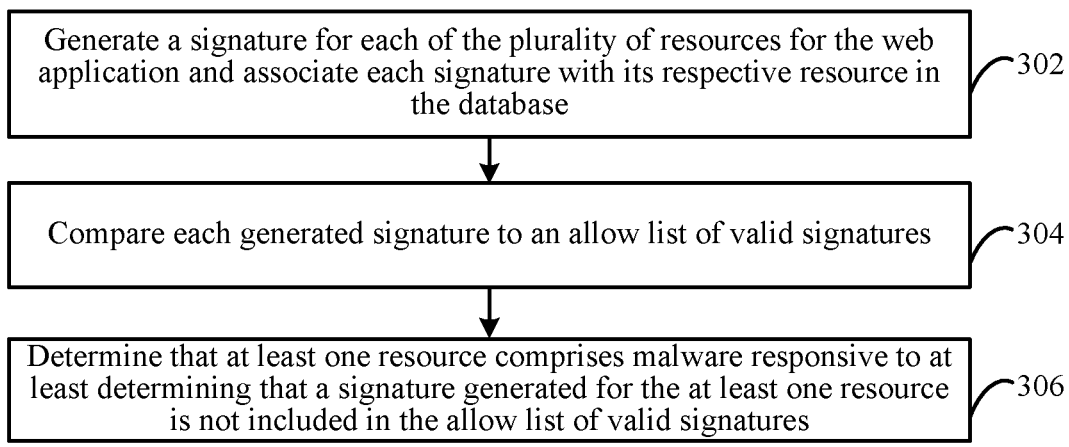
FIG. 3 shows a flowchart of a method for detecting malware based on signature analysis in accordance with an example embodiment.

FIG. 3 shows a flowchart 300 of a method for detecting malware based on signature analysis, according to an example embodiment. In an embodiment, flowchart 300 may be implemented by reporting server 104, as described in FIG. 1. Accordingly, flowchart 300 will be described with continued reference to FIG. 1. Other structural and operational embodiments will be apparent to persons skilled in the relevant art(s) based on the following discussion regarding flowchart 300 and system 100 of FIG. 1.

Flowchart 300 of FIG. 3 begins with step 302. In step 302, a signature for each of the plurality of resources for the web application is generated and associated with its respective resource in the database. For example, with reference to FIG. 1, database builder 112 is configured to generate a signature for each of the plurality of resources for the web application. Database builder 112 may store a signature for a given resource in the resource file signature field for the record generated for that resource in supply chain inventory table 132.

In step 304, each generated signature is compared to an allow list of valid signatures. For example, with reference to FIG. 1, malware detector 116 compares each signature stored in the resource file signature field of supply chain inventory table 132 to an allow list of valid signatures stored via known malware table 118.

In step 306, a determination is made that at least one resource of the plurality of resources comprises malware responsive to at least a determination that the signature generated for the at least one resource is not included in the allow list of valid signatures. For example, with reference to FIG. 1, malware detector 116 determines that at least one resource of the plurality of resources comprises malware responsive to at least a determination that the signature generated for the at least one resource is not included in the allow list of valid signatures stored via known malware table 118.

Figure 4:
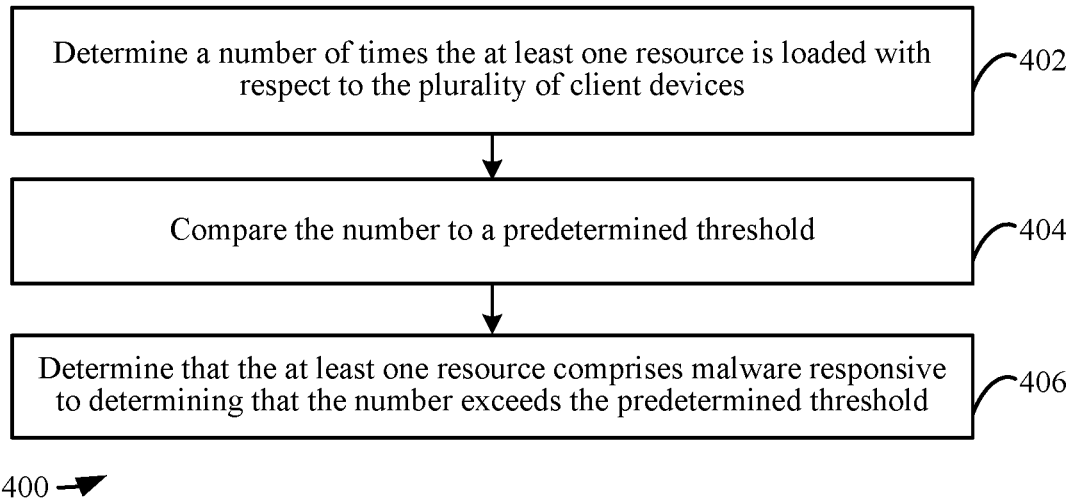
FIG. 4 shows a flowchart of a method for detecting malware based on a number of times a resource has been loaded in accordance with an example embodiment.

FIG. 4 shows a flowchart 400 of a method for detecting potential malware based on a number of times a resource has been loaded, according to an example embodiment. In an embodiment, flowchart 400 may be implemented by reporting server 104, as described in FIG. 1. Accordingly, flowchart 400 will be described with continued reference to FIG. 1. Other structural and operational embodiments will be apparent to persons skilled in the relevant art(s) based on the following discussion regarding flowchart 400 and system 100 of FIG. 1.

Flowchart 400 of FIG. 4 begins with step 402. In step 402, responsive to determining that the signature generated for the at least one resource is not included in the allow list of valid signatures, a number of client devices of the plurality of client devices on which the at least one resource is loaded is determined. For example, with reference to FIG. 1, malware generator 116 is configured to, responsive to a determination that the signature generated for the at least one resource is not included in the allow list of valid signatures stored via known malware table 118, determine a number of clients of clients 102A-102N on which the at least one resource is loaded is determined. For instance, malware generator 116 may retrieve the value stored in the number of hits field for the record generated for that at least one resource in supply chain inventory table 132. This value is indicative of the number of clients of clients 102A-102N that have loaded the resource.

In step 404, the number is compared to a predetermined threshold. For example, with reference to FIG. 1, malware detector 116 compares the number to a predetermined threshold.

In step 406, a determination is made that the at least one resource comprises malware responsive to determining that the number exceeds the predetermined threshold. For example, with reference to FIG. 1, malware detector 116 determines that the at least one resource comprises malware responsive to determining that the number exceeds the predetermined threshold.

Figure 5:
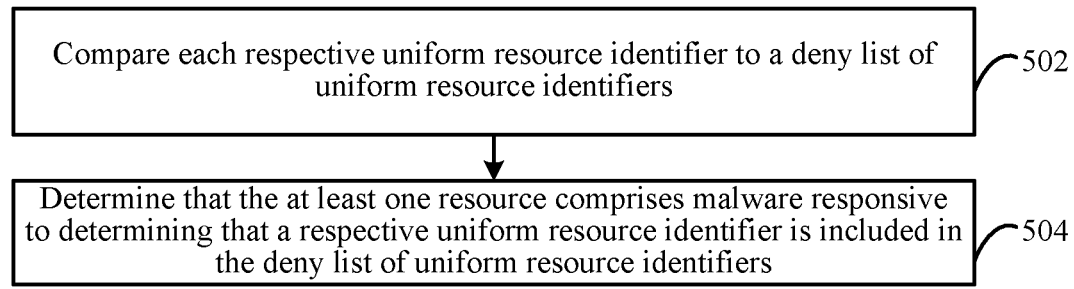
FIG. 5 shows a flowchart of a method for detecting malware based on an analysis of uniform resource identifiers associated with resources in accordance with an example embodiment.

FIG. 5 shows a flowchart 500 of a method for detecting malware based on an analysis of uniform resource identifiers associated with resources, according to an example embodiment. In an embodiment, flowchart 500 may be implemented by reporting server 104, as described in FIG. 1. Accordingly, flowchart 500 will be described with continued reference to FIG. 1. Other structural and operational embodiments will be apparent to persons skilled in the relevant art(s) based on the following discussion regarding flowchart 500 and system 100 of FIG. 1.

Flowchart 500 of FIG. 5 begins with step 502. In step 502, each respective uniform resource identifier specified in the database for a respective resource of the plurality of resources is compared to a deny list of uniform resource identifiers. Each respective uniform resource identifier corresponds to a location at which its corresponding resource is located and retrievable. For example, with reference to FIG. 1, malware detector 116 may, for each resource, retrieve a uniform resource identifier stored in the resource file name field for the record generated for that resource in supply chain inventory table 132. Malware detector 116 may compare the retrieved uniform resource identifier to a deny list of uniform resource identifiers stored via known malware table 118, known suspicious domain table 120, and/or known dangling domain table 122.

In step 504, a determination is made that the at least one resource comprises malware responsive to determining that a respective uniform resource identifier is included in the deny list of uniform resource identifiers. For example, with reference to FIG. 1, malware detector 116 determines that the at least one resource comprises malware responsive to determining that the respective uniform resource identifier is included in the deny list of uniform resource identifiers.

Figure 6:
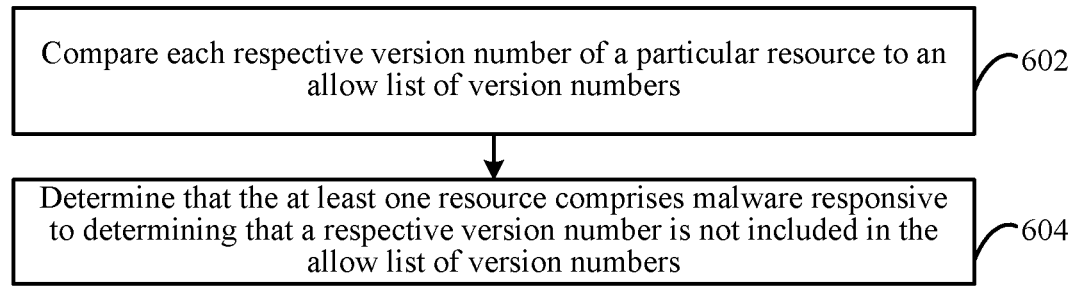
FIG. 6 shows a flowchart of a method for detecting malware based on an analysis of version information associated with resources in accordance with an example embodiment.

FIG. 6 shows a flowchart 600 of a method for detecting malware based on an analysis of version information associated with resources, according to an example embodiment. In an embodiment, flowchart 600 may be implemented by reporting server 104, as described in FIG. 1. Accordingly, flowchart 600 will be described with continued reference to FIG. 1. Other structural and operational embodiments will be apparent to persons skilled in the relevant art(s) based on the following discussion regarding flowchart 600 and system 100 of FIG. 1.

Flowchart 600 of FIG. 6 begins with step 602. In step 602, each respective version number specified in the database for a respective resource of the plurality of resources is compared to an allow list of version numbers. Each respective version number is specified by CSP-based provided by the plurality of different browser applications. For example, with reference to FIG. 1, malware detector 116 may, for each resource, retrieve a version number stored in the resource file name field for the record generated for that resource in supply chain inventory table 132. Malware detector 116 may compare the retrieved version number to an allow list of version numbers stored via dependent package table 128.

In step 604, a determination is made that the at least one resource comprises malware responsive to determining that a respective version number is not included in the allow list of version numbers. For example, with reference to FIG. 1, malware detector 116 determines that the at least one resource comprises malware responsive to determining that the respective version number is not included in the allow list of uniform resource identifiers.

B. CSP-Data Collection Schemes

One obvious way to introduce CSP into a web application is to add response headers "Content-Security-Policy" and "Content-Security-Policy-Report-Only" with appropriate directives by the application itself which requires code changes. However, this approach is time and resource consuming. In accordance with an embodiment described herein, a browser extension of a browser application (e.g., browser application 110) may insert such response headers into responses received from web servers, and the browser application provides a message comprising a report to reporting server (e.g., reporting server 104) responsive to detecting such responses. Such an embodiment is described below in Subsection II.B.1. Another approach is to utilize a proxy that inserts the response headers into responses received from web servers and then provides the modified responses to browser application 110. Such an embodiment is described below in Subsection II.B.2. Such approaches will provide a large amount of metadata to correctly calculate the overall runtime supply chain risk, along with finding additional attack vectors. In addition, the "Content-Security-Policy-Report-Only" header operates in the background of a browser application, as CSP is reported by the browser. Therefore, it is not expected to affect the performance of the browser.

1. Browser Extension-Based CSP Reporting Schemes

Figure 7:
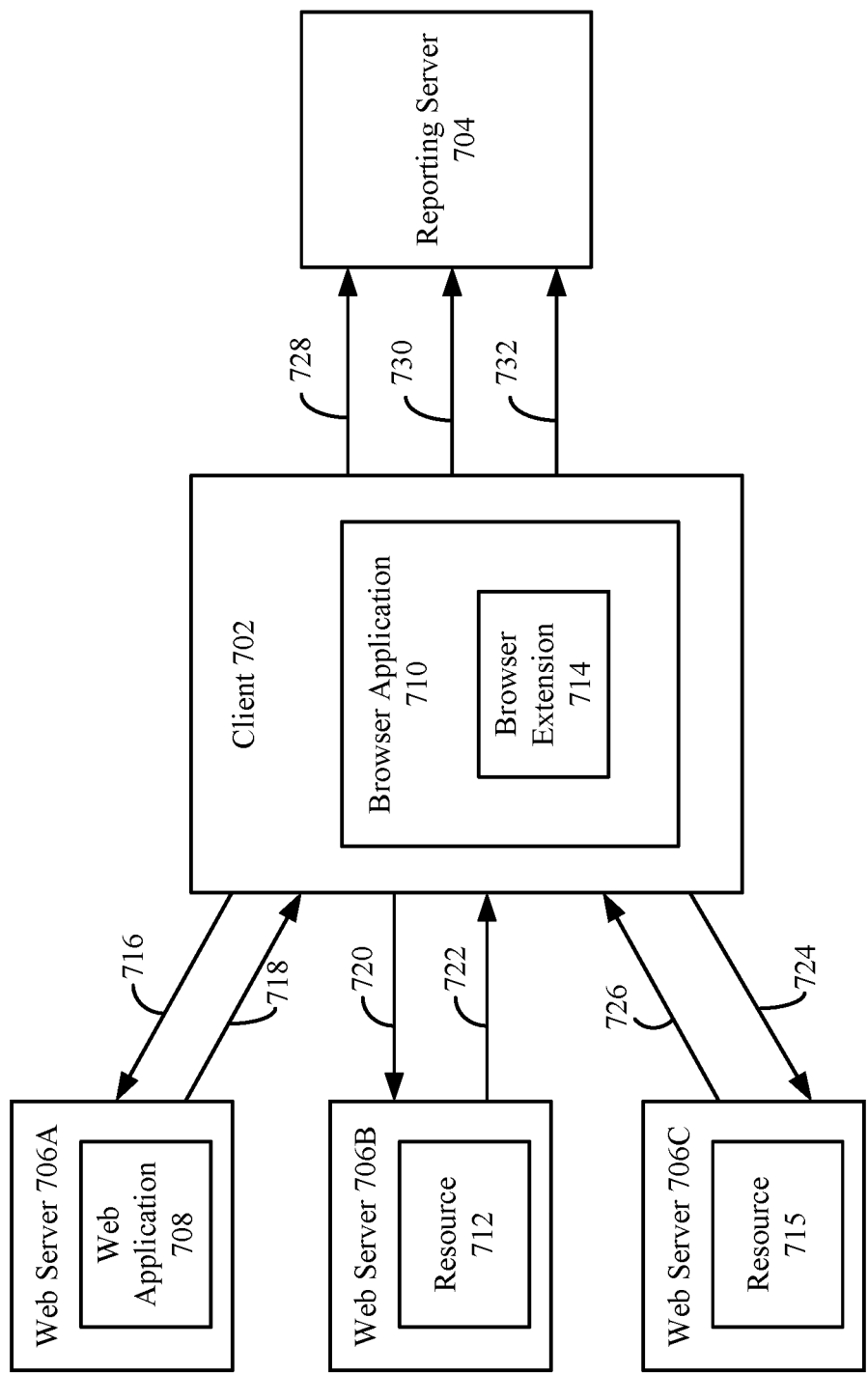
FIG. 7 shows a block diagram of a system for providing content security policy-based data to a reporting server via a browser extension in accordance with an example embodiment.

FIG. 7 shows a block diagram of a system 700 for providing CSP-based data to a reporting server via a browser extension in accordance with an example embodiment. As shown in FIG. 7, system 700 includes a client 702, a reporting server 704, and a plurality of web servers 706A-706C. Client 702 is an example of clients 102A-102N, and reporting server 704 is an example of reporting server 104, as respectively described above with reference to FIG. 1. Client 702 may be communicatively coupled to web servers 706A-706N via a first network, and client 702 may be communicatively coupled to reporting server 704 via a second network. Examples of first network and second network include network 108, as described above with reference to FIG. 1.

As also shown in FIG. 7, web server 706A may host a web application 708, web server 706B may host a resource 712, and web server 706C may host a resource 715. Each of resources 712 and 714 may be resources on which web application 708 depends. Resources 712 and/or 714 may comprise scripts (e.g., JavaScript scripts), IFRAME content, style sheets (e.g., Cascading Style Sheets), images, audio files, video files, web fonts, web workers, and/or embeddable objects, such as Java applets, ActiveX objects, etc. Client 702 comprises a browser application 710, which is an example of browser application 710, as described above with reference to FIG. 1. As further shown in FIG. 1, browser application 710 comprises a browser extension 714. Browser extension 714 may be a small software module that provides custom functionality for browser application 710. As described below, such custom functionality comprises modifying responses received from web servers 706A-706C to include response headers, such as, CSP-report-only headers.

Web application 708 is application software that executes on web server 706A configured to accept requests via a network protocol (e.g., a hypertext transfer protocol (HTTP)), rather than being executed locally on computing device 702. Web application 708 is accessible by a user via browser application 710. Web application 708 may be programmed using a client-server modeled structure, where the user (or "client") is provided services through web server 706A, which may be hosted by a third-party. Examples of web applications 708 include, but are not limited to, webmail applications, online banking applications, a suite of productivity applications provided as a software-as-a-service (SaaS), etc. Examples of productivity applications include, but are not limited to, a word processing application (e.g., Microsoft Word® published by Microsoft® Corp.), a spreadsheet application (e.g., Microsoft Excel® published by Microsoft® Corp.), a presentation application (e.g., Microsoft PowerPoint® published by Microsoft® Corp.), etc. An example of a productivity suite that is offered as a SaaS includes, but is not limited to, Microsoft® Office 365™ published by Microsoft® Corp.).

To access web application 708, browser application 714 may provide a request 716 to web server 706A. Request 716 may be initiated based on user input provided via browser application 710 (e.g., a user specifying a uniform resource identifier of web application 708 in the address bar of browser application 710). In response, web server 706A provides a response 718 that may comprise data (e.g., HTML) that browser application 710 utilizes to render a web application 708 via a user interface of browser application 710. Response 718 may further specify uniform resource identifier(s) of other endpoints from which resources on which web application 708 depends are to be retrieved by browser application 710. For instance, response 718 may specify a uniform resource identifier for web server 706B and/or a resource to retrieve therefrom (e.g., resource 712).

Responsive to receiving response 718, browser extension 714 may modify response 718 to insert a response header that causes browser application 710 to generate a report comprising the uniform resource identifier of web server 706A, specifies an identifier of web application 708, specifies the uniform resource identifier of web server 706B, and/or an identifier of resource 712. In accordance with embodiments described herein, browser extension 714 inserts a CSP-report-only header. After modifying response 718, browser application 710 analyzes and detects the response header inserted by browser extension 714. Responsive to detecting the response header, browser application 710 generates a message 728 that specifies an identifier of web application 708, specifies the uniform resource identifier of web server 706B, and/or an identifier of resource 712. Browser application 710 sends message 728 to reporting server 704. In accordance with an embodiment, message 728 is an HTTP POST request.

Browser application 710 is also configured to retrieve resource 712 from web server 706B. For instance, browser application 710 may provide a request 720 to web server 706B. In response, web server 706A provides a response 722 that comprises resource 712. Response 722 may further specify uniform resource identifier(s) of other endpoints from which resources on which web application 708 depends are to be retrieved by browser application 710. For instance, response 722 may specify a uniform resource identifier for web server 706C and/or a resource to retrieve therefrom (e.g., resource 715).

Responsive to receiving response 722, browser extension 714 may modify response 722 to insert a response header (e.g., a CSP-report-only header) that causes browser application 710 to generate a report comprising the uniform resource identifier of web server 706B, specifies an identifier of resource 712, specifies the uniform resource identifier of web server 706C, and/or an identifier of resource 715. After modifying response 722, browser application 710 analyzes and detects the response header inserted by browser extension 714. Responsive to detecting the response header, browser application 710 generates a message 730 that specifies the uniform resource identifier of web server 706B, specifies an identifier of resource 712, specifies the uniform resource identifier of web server 706C, and/or an identifier of resource 715. Browser application 710 sends message 730 to reporting server 704. In accordance with an embodiment, message 730 is an HTTP POST request.

Browser application 710 is also configured to retrieve resource 715 from web server 706C. For instance, browser application 710 may provide a request 724 to web server 706C. In response, web server 706C provides a response 726 that comprises resource 715. Response 726 may further specify uniform resource identifier(s) of other entities from which resources on which web application 708 depends are to be retrieved by browser application 710. However, in the example shown in FIG. 7, no further resources are required for web application 708.

Responsive to receiving response 726, browser extension 714 may modify response 726 to insert a response header (e.g., a CSP-report-only header) that causes browser application 710 to generate a report comprising the uniform resource identifier of web server 706C and/or specifies an identifier of resource 715. After modifying response 726, browser application 710 analyzes and detects the response header inserted by browser extension 714. Response to detecting the response header, browser application 710 generates a message 732 that specifies the uniform resource identifier of web server 706C and/or specifies an identifier of resource 715. Browser application 710 sends message 732 to reporting server 704. In accordance with an embodiment, message 732 is an HTTP POST request.

In certain scenarios, any of responses 718, 722 and/or 726 may already comprise a CSP-report-only header comprising web server and/or web application/resource identifiers. In such scenarios, browser extension 714 does not modify responses 718, 722, and/or 726. Instead, browser application 710 generates and provides messages 728, 730 and/or 732 to reporting server 704 responsive to detecting the response headers included in responses 718, 722 and/or 726.

In accordance with an embodiment, the functionality of browser extension 714 described herein may be incorporated into browser application 710 and such functionality is native to browser application 710 without requiring installation of browser extension 714.

As described above in Subsection II.A, reporting server 704 is configured to generate a database comprising a supply chain inventory table (supply chain inventory table 132, as shown in FIG. 1) that specifies resources associated with a web application, along with a chain of dependencies of such resources, using the information provided via messages 728, 730, and 732 Using the information stored in supply chain inventory table 132, reporting server 704 performs a malware analysis with respect to web application 708, resource 712, and/or resource 715.

Figure 8:
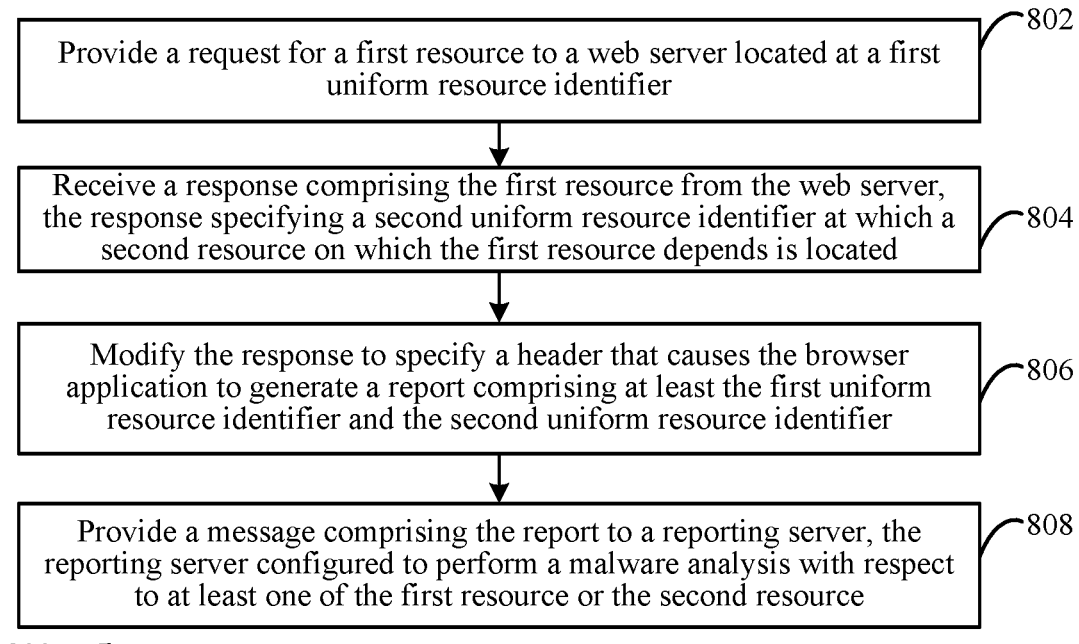
FIG. 8 shows a flowchart of a method for providing content security policy-based data to a reporting server via a browser extension in accordance with an example embodiment.

Accordingly, CSP-based data may be provided to a reporting server via a browser extension in many ways. For example, FIG. 8 shows a flowchart 800 of a method for providing CSP-based data to a reporting server via a browser extension in accordance with an example embodiment. In an embodiment, flowchart 800 may be implemented by reporting server browser application 710, as described in FIG. 7. Accordingly, flowchart 800 will be described with continued reference to FIG. 7. Other structural and operational embodiments will be apparent to persons skilled in the relevant art(s) based on the following discussion regarding flowchart 800 and system 700 of FIG. 7.

Flowchart 800 of FIG. 8 begins with step 802. In step 802, a request for a first resource is provided to a web server located at a first uniform resource identifier. For example, with reference to FIG. 7, browser application 710 provides a request 716 to web server 706A for a web application 708 hosted thereby.

In step 804, a response comprising the first resource is received from the web server. The response specifies a second uniform resource identifier at which a second resource on which the first resource depends is located. For example, with reference to FIG. 7, browser application 710 receives a response 718 from web server 706A. Response 718 specifies a uniform resource identifier of web server 706B, which hosts resource 712 on which web application 708 depends.

In accordance with one or more embodiments, the at least one of the first resource or the second resource comprises a web application, a script, a cascading style sheet, an image, a web worker, an applet, an audio file, or a video file. For example, with reference to FIG. 7, any of resources 712 and/or 714 may comprise a script, a cascading style sheet, an image, a web worker, an applet, an audio file, or a video file.

In step 806, the response is modified to specify a header that causes the browser application to generate a report comprising at least the first uniform resource identifier and the second uniform resource identifier. For example, with reference to FIG. 8, browser extension 714 modifies response 718 to specify a header that causes browser application 710 to generate a report comprising an identifier of web application 708, the uniform resource identifier of web server 706A, an identifier of resource 712, and/or a uniform resource identifier of web server 706B.

In accordance with one or more embodiments, modifying the response comprises modifying the response in response to determining that the response does not include the header. For example, with reference to FIG. 7, browser extension 714 is configured to analyze response 718 to determine whether response 718 comprises the header. If the header is not present, browser extension 714 modifies response 718 to include the header, as described above.

In accordance with one or more embodiments, the header is a CSP-report-only header.

In step 808, a message comprising the report is provided to a reporting server. The reporting server is configured to perform a malware analysis with respect to at least one of the first resource or the second resource. For example, with reference to FIG. 7, browser application 710 provides message 728 comprising the report to reporting server 704, which performs a malware analysis with respect to at least one of web application 708 or resource 712.

In accordance with one or more embodiments, the message is an HTTP POST request. For example, with reference to FIG. 7, message 728 is an HTTP POST request.

Figure 9:
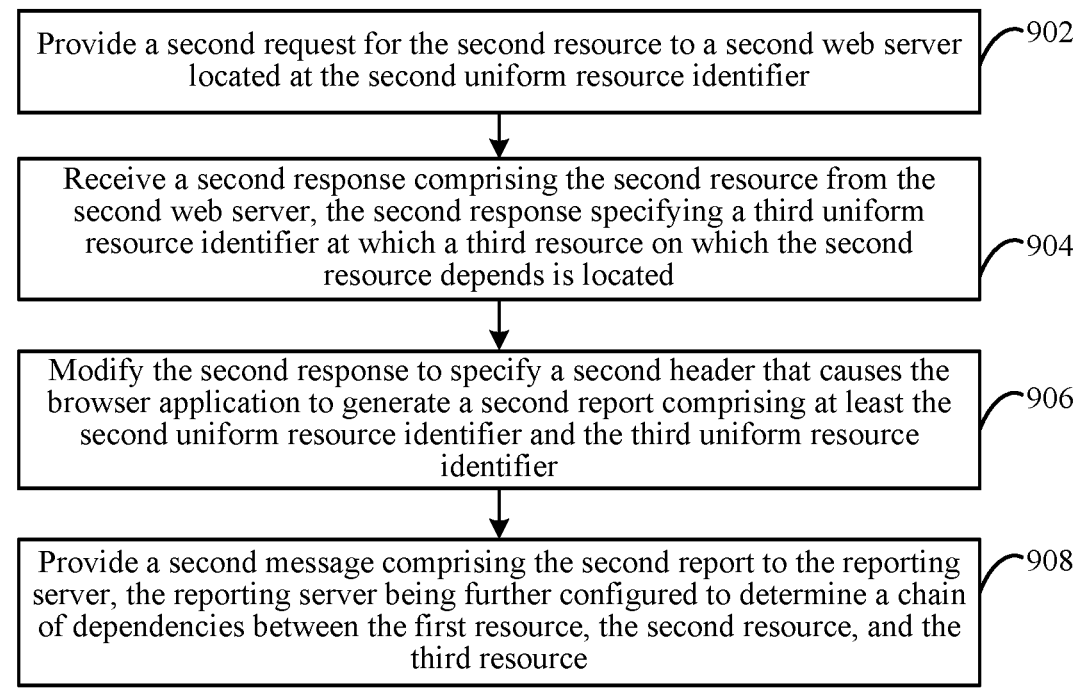
FIG. 9 shows a flowchart of a method for providing additional content security policy-based data to a reporting server via a browser extension in accordance with an example embodiment.

Browser application 710 is further configured to retrieve resource 712 and provide additional CSP-related-data based on retrieving resource 712. For example, FIG. 9 shows a flowchart 900 of a method for providing additional CSP-based data to a reporting server via a browser extension in accordance with an example embodiment. In an embodiment, flowchart 900 may be implemented by browser application 710, as described in FIG. 7. Accordingly, flowchart 900 will be described with continued reference to FIG. 7. Other structural and operational embodiments will be apparent to persons skilled in the relevant art(s) based on the following discussion regarding flowchart 900 and system 700 of FIG. 7.

Flowchart 900 of FIG. 9 begins with step 902. In step 902, a second request for a second resource is provided to a second web server located at the second uniform resource identifier. For example, with reference to FIG. 7, browser application 710 provides a request 720 to web server 706B for resource 712 hosted thereby.

In step 904, a second response comprising the second resource is received from the second web server. The second response specifies a third uniform resource identifier at which a third resource on which the second resource depends is located. For example, with reference to FIG. 7, browser application 710 receives a response 722 from web server 706B. Response 722 specifies a uniform resource identifier of web server 706C, which hosts resource 715 on which resource 712 depends.

In step 906, the second response is modified to specify a second header that causes the browser application to generate a second report comprising at least the second uniform resource identifier and the third uniform resource identifier. For example, with reference to FIG. 7, browser extension 714 modifies response 722 to specify a second header that causes browser application 710 to generate a second report comprising an identifier of resource 712, the uniform resource identifier of web server 706B, an identifier of resource 715, and/or a uniform resource identifier of web server 706C.

In step 908, the second message comprising the second report is provided to the reporting server. The reporting server is further configured to determine a chain of dependencies between the first resource, the second resource, and the third resource. For example, with reference to FIG. 7, browser application 710 provides request 730 comprising the second message to reporting server 704, which determines a chain of dependencies between web application 708, resource 712, and 714 in a similar manner as described above in Subsection II.A.

2. Proxy-Based CSP Reporting Schemes

Figure 10:
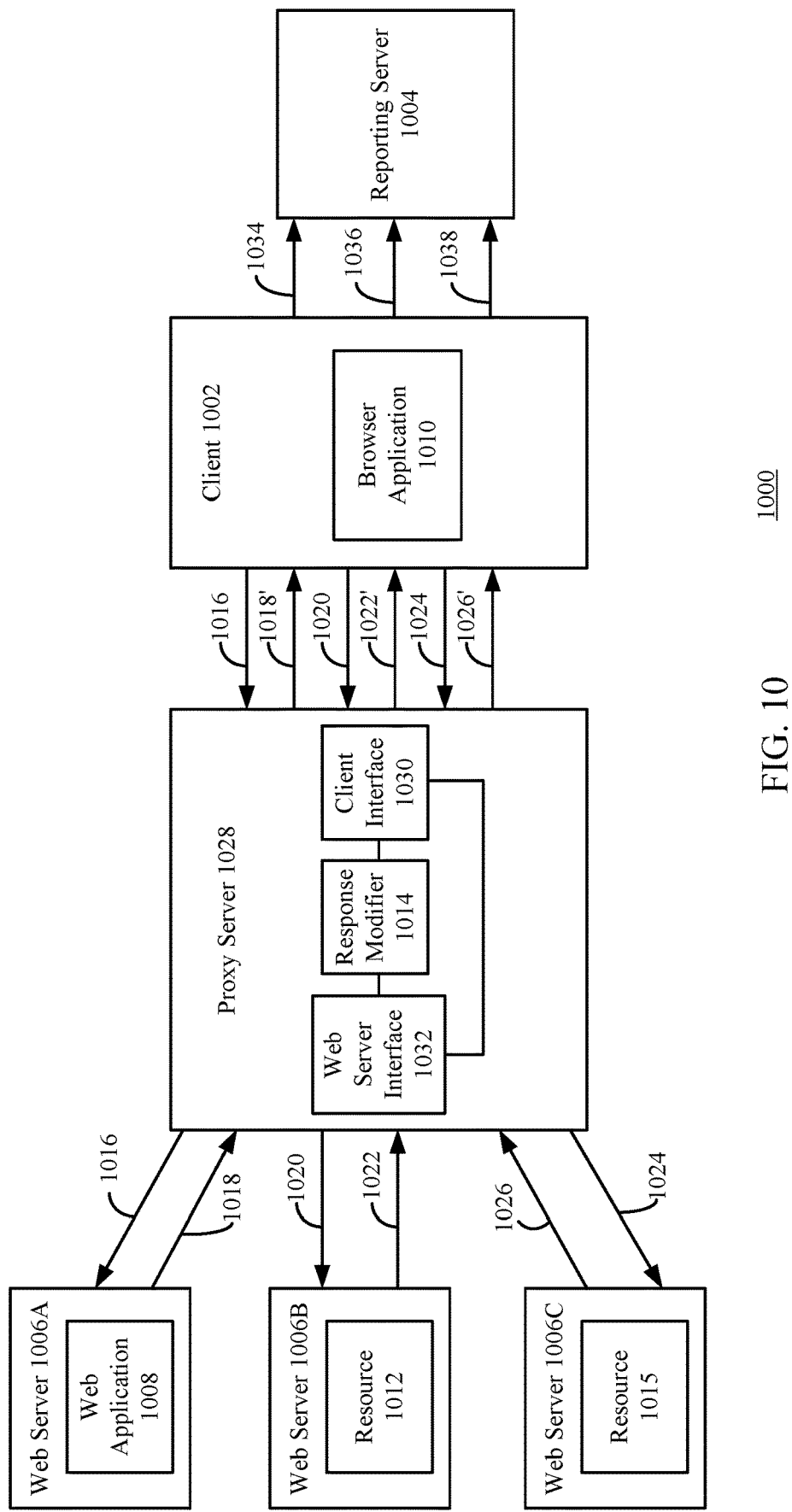
FIG. 10 shows a block diagram of a system for providing content security policy-based data via a proxy server in accordance with an example embodiment.

FIG. 10 shows a block diagram of a system 1000 for providing CSP-based data via a proxy server in accordance with an example embodiment. As shown in FIG. 10, system 1000 includes a client 1002, a reporting server 1004, a plurality of web servers 1006A-1006C. Client 1002 is an example of client 702, reporting server 1004 is an example of reporting server 704, and web servers 1006A-1006C are examples of web servers 706A-706C, as respectively described above with reference to FIG. 7. Client 1002, web servers 1006A-1006C, and/or proxy server 1028 may be communicatively coupled via a first network, and client 1002 may be communicatively coupled to reporting server 1004 via a second network. Examples of first network and second network include network 108, as described above with reference to FIG. 1. Proxy server 1028 may be implemented via a physical computing device, a virtual machine executing on a physical computing device, and/or any type of device comprising one or more processors and/or memories that is configured to process data. Alternatively, proxy server 1028 may be implemented as a software application that executes on a physical computing device or via a virtual machine executing on a physical computing device.

As also shown in FIG. 10, web server 1006A may host a web application 1008, web server 1006B may host a resource 1012, and web server 1006C may host a resource 1015. Each of resources 1012 and 1015 may be resources on which web application 1008 depends. Resources 1012 and 1015 are examples of resources 712 and 714, as described above with reference to FIG. 7. Client 1002 comprises a browser application 1010, which is an example of browser application 710, as described above with reference to FIG. 7. As further shown in FIG. 10, proxy server 1028 comprises a response modifier 1014, a client interface 1030 and a web server interface 1032. Each of client interface 1030 and web server interface 1032 may comprise a network interface configured to transmit and/or receive network-based (e.g., HTTP) requests and/or responses.

It is noted that while FIG. 10 shows a single client (i.e., client 1002) and three web servers (i.e., web servers 1006A-1006C), proxy server 1028 may be coupled to any number of web servers and clients.

To access web application 1008, browser application 1010 may provide a request 1016, which may be received by client interface 1030 of proxy server 1028. Request 1016 may be initiated based on user input provided via browser application 1010 (e.g., a user specifying a uniform resource identifier of web application 1008 in the address bar of browser application 1010). Client interface 1030 provides response 1016 to web server interface 1032 of proxy server 1028, and web server interface 1032 may provide request 1016 to web server 1006A (i.e., proxy server 1028 acts as a "pass through" that passes requests received from browser application 1010 to a target endpoint specified by the request). In response to receiving request 1016, web server 1006A provides a response 1018 that may comprise data (e.g., HTML) that browser application 1010 utilizes to render web application 1008 via a user interface of browser application 1010. Response 1018 may further specify uniform resource identifier(s) of other endpoints from which resources on which web application 1008 are to be retrieved by browser application 1010. For instance, response 1018 may specify a uniform resource identifier for web server 1006B and/or a resource to retrieve therefrom (e.g., resource 1012).

Web server interface 1032 is configured to receive response 1018 and provides response 1018 to response modifier 1014. Response modifier 1014 of proxy server 1028 may modify response 1018 to insert a response header that instructs browser application 1010 to generate a report comprising the uniform resource identifier of web server 1006A, specifies an identifier of web application 1008, specifies the uniform resource identifier of web server 1006B, and/or an identifier of resource 1012. In accordance with embodiments described herein, response header 1014 inserts a CSP-report-only header that specifies such information. After response modifier 1014 modifies response 1018, client interface 1030 of proxy server 1028 provides the modified response (shown as response 1018') to client 1002.

Browser application 1010 of client 1002 is configured to analyze modified response 1018' to determine whether modified response 1018' comprises a response header (e.g., a CSP-report-only header). Responsive to detecting such a response header, client 1002 generates a report and provides the report to reporting server via a message 1034. If such a header was not detected in a response received from proxy server 1028, then browser application 1010 does not provide the message to reporting server 1004. In accordance with an embodiment, message 1034 is an HTTP POST request.

Browser application 1010 is also configured to retrieve resource 1012 from web server 1006B. For instance, browser application 1010 may provide a request 1020, which may be received by client interface 1030 of proxy server 1028. Client interface 1030 provides request 1020 to web server interface, and web server interface 1032 of proxy server 1028 may provide request 1020 to web server 1006B. In response to receiving request 1020, web server 1006B provides a response 1022 that comprises resource 1012. Response 1022 may further specify uniform resource identifier(s) of other endpoints from which resources on which web application 1008 depends are to be retrieved by browser application 1010. For instance, response 1022 may specify a uniform resource identifier for web server 1006C and/or a resource to retrieve therefrom (e.g., resource 1015).

Response 1022 is received by web server interface 1032 and provides response 1022 to response modifier 1014. Response modifier 1014 may modify response 1022 to insert a response header (e.g., a CSP-report-only header) that instructs browser application 1010 to generate a report comprising the uniform resource identifier of web server 1006B, specifies an identifier of resource 1012, specifies the uniform resource identifier of web server 1006C, and/or an identifier of resource 1015. After response modifier 1014 modifies response 1022, client interface 1030 of proxy server 1028 provides the modified response (shown as response 1022') to client 1002.

Browser application 1010 of client 1002 is configured to analyze modified response 1022' to determine whether modified response 1022' comprises a response header (e.g., a CSP-report-only header). Responsive to detecting such a response header, browser application 1010 generates a report comprising the uniform resource identifier of web server 1006B, specifies an identifier of resource 1012, specifies the uniform resource identifier of web server 1006C, and an identifier of resource 1015. Browser application 1010 provides the report to reporting server via a message 1036. If such a header was not detected in a response received from proxy server 1028, then browser application 1010 does not provide the message to reporting server 1004. In accordance with an embodiment, message 1036 is an HTTP POST request.

Browser application 1010 is also configured to retrieve resource 1015 from web server 1006C. For instance, browser application 1010 may provide a request 1024, which may be received by client interface 1030 of proxy server 1028. Client interface 1030 may provide request 1024 to web server interface 1032, and web server interface 1032 of proxy server 1028 may provide request 1024 to web server 1006C. In response to receiving request 1024, web server 1006C provides a response 1026 that comprises resource 1015. Response 1026 may further specify uniform resource identifier(s) of other endpoints from which resources on which web application 1008 depends are to be retrieved by browser application 1010. However, in the example shown in FIG. 10, no further resources are required for web application 1008.

Web server interface 1032 receives response 1026 and provides response 1026 to response modifier 1014. Response modifier 1014 may modify response 1026 to insert a response header (e.g., a CSP-report-only header) that instructs browser application 710 to generate a report that specifies the uniform resource identifier of web server 1006C and/or specifies an identifier of resource 1015. After response modifier 1014 modifies response 1026, client interface of proxy server 1028 provides the modified response (shown as response 1026') to client 1002.

Browser application 1010 of client 1002 is configured to analyze modified response 1026' to determine whether modified response 1026' comprises a response header (e.g., a CSP-report-only header). Responsive to detecting such a response header, browser application 1010 generates the report comprising the uniform resource identifier of web server 1006B, specifies the uniform resource identifier of web server 1006C and/or specifies an identifier of resource 1015. Browser application 1010 provides a message 1038 comprising the report to reporting server 1004. If such a header was not detected in a response received from proxy server 1028, then browser application 1010 does not provide the message to reporting server 1004. In accordance with an embodiment, message 1038 is an HTTP POST request.

In certain scenarios, any of responses 1018, 1022 and/or 1026 may already comprise a CSP-report-only header comprising web server and/or web application/resource identifiers. In such scenarios, response modifier 1014 does not modify responses 1018, 1022, and/or 1026. Instead, proxy server 1028 provides responses 1018, 1022 and/or 1026 to client 1002.

As described above in Subsection II.A, reporting server 1004 is configured to generate a database comprising a supply chain inventory table (supply chain inventory table 132, as shown in FIG. 1) that specifies resources associated with a web application, along with a chain of dependencies of such resources, using the information provided via messages 1034, 1036, and 1038. Using the information stored in supply chain inventory table 132, reporting server 1004 performs a malware analysis with respect to web application 1008, resource 1012, and/or resource 1015.

Figure 11:
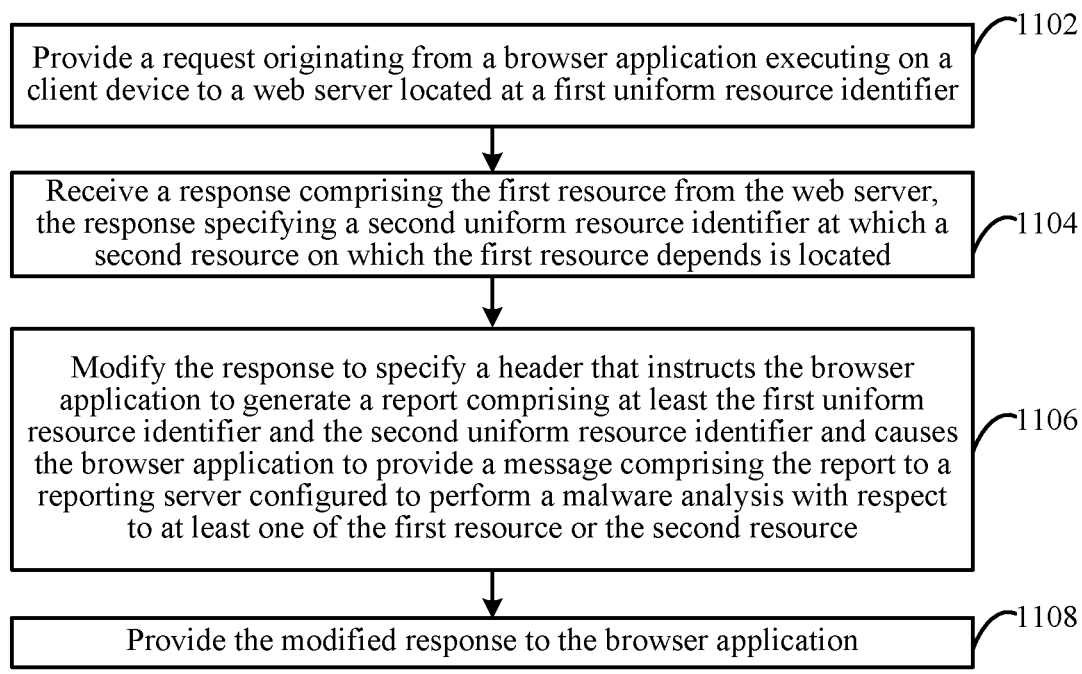
FIG. 11 shows a flowchart of a method for providing content security policy-based data to a reporting server via a proxy server in accordance with an example embodiment.

Accordingly, CSP-based data may be provided to a reporting server via a proxy server in many ways. For example, FIG. 11 shows a flowchart 1100 of a method for providing CSP-based data to a reporting server via a proxy server in accordance with an example embodiment. In an embodiment, flowchart 1100 may be implemented by proxy server 1028, as described in FIG. 10. Accordingly, flowchart 1100 will be described with continued reference to FIG. 10. Other structural and operational embodiments will be apparent to persons skilled in the relevant art(s) based on the following discussion regarding flowchart 1100 and system 1000 of FIG. 10.

Flowchart 1100 of FIG. 11 begins with step 1102. In step 1102, a request originating from a browser application executing on a client device is provided to a web server located at a first uniform resource identifier. For example, with reference to FIG. 10, web server interface 1032 of proxy server 1028 provides a request 1016, which originates from browser application 1010 of client 1002, to web server 1006A for a web application 1008 hosted thereby.

In step 1104, a response comprising the first resource is received from the web server. The response specifies a second uniform resource identifier at which a second resource on which the first resource depends is located. For example, with reference to FIG. 10, web server interface 1032 of proxy server 1028 receives a response 1018 from web server 1006A. Response 1018 specifies a uniform resource identifier of web server 1006B, which hosts resource 1012 on which web application 1008 depends.

In accordance with one or more embodiments, the at least one of the first resource or the second resource comprises a web application, a script, a cascading style sheet, an image, a web worker, an applet, an audio file, or a video file. For example, with reference to FIG. 10, any of resources 1012 and/or 1015 may comprise a script, a cascading style sheet, an image, a web worker, an applet, an audio file, or a video file.

In step 1106, the response is modified to specify a header that instructs the browser application to generate a report comprising at least the first uniform resource identifier and the second uniform resource identifier and causes the browser application to provide a message comprising the report to a reporting server configured to perform a malware analysis with respect to at least one of the first resource or the second resource. For example, with reference to FIG. 10, request modifier 1014 of proxy server 1028 modifies response 1018 to specify a header that instructs browser application 1010 to generate a report comprising an identifier of web application 1008, the uniform resource identifier of web server 1006A, an identifier of resource 1012, and/or a uniform resource identifier of web server 1006B and causes browser application 1010 to provide message 1034 comprising the report to reporting server 1004 configured to perform a malware analysis with respect to at least one of the first resource or the second resource.

In accordance with one or more embodiments, modifying the response comprises modifying the response in response to determining that the response does not include the header. For example, with reference to FIG. 10, response modifier 1014 is configured to analyze response 1018 to determine whether response 1018 comprises the header. If the header is not present, response modifier 1014 modifies response 1018 to include the header, as described above.

In accordance with one or more embodiments, the header is a CSP-report-only header.

In step 1108, the modified response is provided to a browser application. For example, with reference to FIG. 10, client interface 1030 of proxy server 1028 provides modified response 1018' to browser application 1010. Modified response 1018' (i.e., the CSP-report-only header of modified response 1018') instructs browser application 1010 to provide message 1034 to reporting server 1004, which performs a malware analysis with respect to at least one of web application 1008 or resource 1012.

In accordance with one or more embodiments, the message is an HTTP POST request. For example, with reference to FIG. 10, message 1034 is an HTTP POST request.

Figure 12:
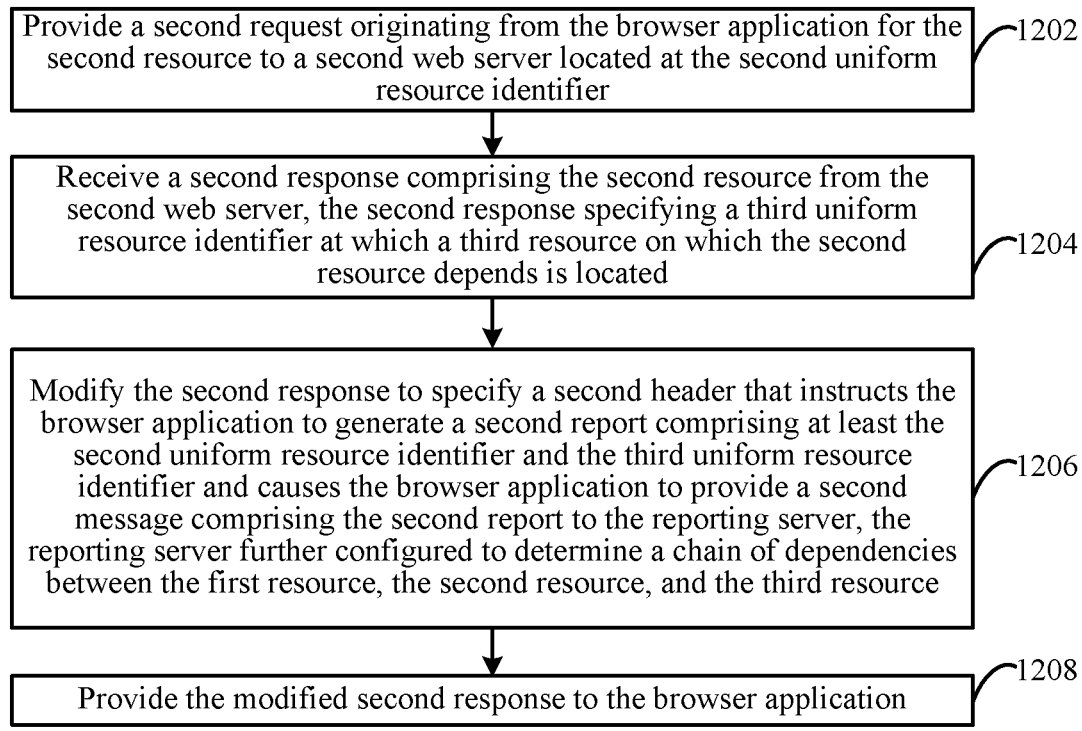
FIG. 12 shows a flowchart of a method for providing additional content security policy-based data to a reporting server via a proxy server in accordance with an example embodiment.

Browser application 1010 is further configured to retrieve resource 1012 and provide additional CSP-related-data to reporting server 1004 based on retrieving resource 1012. For example, FIG. 12 shows a flowchart 1200 of a method for providing additional CSP-based data to a reporting server via a proxy server in accordance with an example embodiment. In an embodiment, flowchart 1200 may be implemented by proxy server 1028, as described in FIG. 10. Accordingly, flowchart 1200 will be described with continued reference to FIG. 10. Other structural and operational embodiments will be apparent to persons skilled in the relevant art(s) based on the following discussion regarding flowchart 1200 and system 1000 of FIG. 10.

Flowchart 1200 of FIG. 12 begins with step 1202. In step 1202, a second request originating from the browser application for a second resource is provided to a second web server located at the second uniform resource identifier. For example, with reference to FIG. 10, web server interface 1032 of proxy server 1028 is configured to provide request 1020, which originates from browser application 1010, for resource 1012 hosted by web server 1006B.

In step 1204, a second response comprising the second resource is received from the second web server. The second response specifies a third uniform resource identifier at which a third resource on which the second resource depends is located. For example, with reference to FIG. 10, web server interface 1032 of proxy server 1028 receives a response 1022 from web server 1006B. Response 1022 specifies a uniform resource identifier of web server 1006C, which hosts resource 1015 on which resource 1012 depends.

In step 1206, the second response is modified to specify a header that instructs the browser application to generate a report comprising at least the second uniform resource identifier and the third uniform resource identifier and causes the browser application to provide a second message comprising the second report to the reporting server, which is further configured to determine a chain of dependencies between the first resource, the second resource, and the third resource. For example, with reference to FIG. 10, response modifier 1014 modifies response 1022 to specify a header that instructs browser application 1010 to generate a report comprising an identifier of resource 1012, the uniform resource identifier of web server 1006B, an identifier of resource 1015, and/or a uniform resource identifier of web server 1006C and cause browser application 1010 to provide message 1036 comprising the report to reporting server 1004, which is further configured to determine a chain of dependencies between first resource 1008, second resource 1012, third resource 1015.

In step 1208, the modified second response is provided to the browser application. For example, with reference to FIG. 10, client interface 1030 of proxy server 1028 provides modified response 1022' to browser application 1010. Modified response 1022' instructs (i.e., the CSP-report-only header of modified response 1022') browser application 1010 to provide message 1036 to reporting server 1004, which determines a chain of dependencies between web application 1008, resource 1012, and resource 1015 in a similar manner as described above in Subsection II.A.

III. Example Computer System Implementation

Clients 102A-102N, reporting server 104, database(s) 106, web servers 706A-706N, client 702, reporting server 704, web servers 1006A-1006N, client 1002, reporting server 1004, proxy server 1028 (and/or any of the respective components thereof) and/or flowcharts 200, 300, 400, 500, 600, 800, 900, and/or 1200 may be implemented in hardware, or hardware combined with one or both of software and/or firmware. For example, clients 102A-102N, reporting server 104, database(s) 106, web servers 706A-706N, client 702, reporting server 704, web servers 1006A-1006N, client 1002, reporting server 1004, proxy server 1028 (and/or any of the respective components thereof) and/or flowcharts 200, 300, 400, 500, 600, 800, 900, 1100 and/or 1200 may be implemented as computer program code/instructions configured to be executed in one or more processors and stored in a computer readable storage medium.

Alternatively, clients 102A-102N, reporting server 104, database(s) 106, web servers 706A-706N, client 702, reporting server 704, web servers 1006A-1006N, client 1002, reporting server 1004, proxy server 1028 (and/or any of the respective components thereof) and/or flowcharts 200, 300, 400, 500, 600, 800, 900, 1100 and/or 1200 may be implemented as hardware logic/electrical circuitry.

For instance, in an embodiment, one or more, in any combination, of clients 102A-102N, reporting server 104, database(s) 106, web servers 706A-706N, client 702, reporting server 704, web servers 1006A-1006N, client 1002, reporting server 1004, proxy server 1028 (and/or any of the respective components thereof) and/or flowcharts 200, 300, 400, 500, 600, 800, 900, 1100 and/or 1200 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 13:
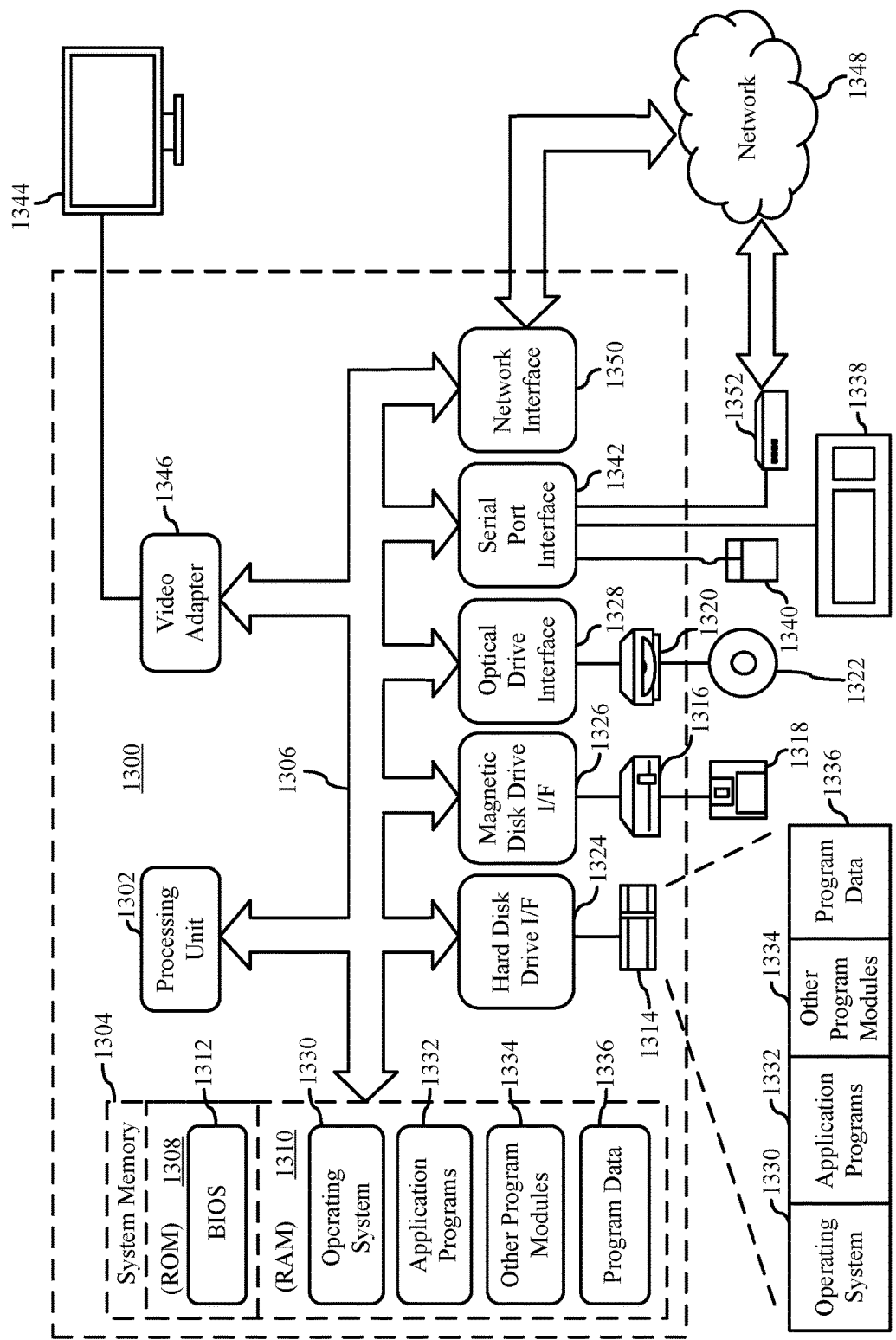
FIG. 13 is a block diagram of an example processor-based computer system that may be used to implement various embodiments.

FIG. 13 depicts an exemplary implementation of a computing device 1300 in which embodiments may be implemented. For example, clients 102A-102N, reporting server 104, database(s) 106, web servers 706A-706N, client 702, reporting server 704, web servers 1006A-1006N, client 1002, reporting server 1004, proxy server 1028 (and/or any of the respective components thereof) and/or flowcharts 200, 300, 400, 500, 600, 800, 900, 1100 and/or 1200 and/or alternative features. The description of computing device 1300 provided herein is provided for purposes of illustration, and is not intended to be limiting. Embodiments may be implemented in further types of computer systems, as would be known to persons skilled in the relevant art(s).

As shown in FIG. 13, computing device 1300 includes one or more processors, referred to as processor circuit 1302, a system memory 1304, and a bus 1306 that couples various system components including system memory 1304 to processor circuit 1302. Processor circuit 1302 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1302 may execute program code stored in a computer readable medium, such as program code of operating system 1330, application programs 1332, other programs 1334, etc. Bus 1306 represents one or more of any of several types of bus structures, including a memory bus or memory controller, a peripheral bus, an accelerated graphics port, and a processor or local bus using any of a variety of bus architectures. System memory 1304 includes read only memory (ROM) 1308 and random-access memory (RAM) 1310. A basic input/output system 1312 (BIOS) is stored in ROM 1308.

Computing device 1300 also has one or more of the following drives: a hard disk drive 1314 for reading from and writing to a hard disk, a magnetic disk drive 1316 for reading from or writing to a removable magnetic disk 1318, and an optical disk drive 1320 for reading from or writing to a removable optical disk 1322 such as a CD ROM, DVD ROM, or other optical media. Hard disk drive 1314, magnetic disk drive 1316, and optical disk drive 1320 are connected to bus 1306 by a hard disk drive interface 1324, a magnetic disk drive interface 1326, and an optical drive interface 1328, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1330, one or more application programs 1332, other programs 1334, and program data 1336. Application programs 1332 or other programs 1334 may include, for example, computer program logic (e.g., computer program code or instructions) for implementing any of the features of clients 102A-102N, reporting server 104, database(s) 106, web servers 706A-706N, client 702, reporting server 704, web servers 1006A-1006N, client 1002, reporting server 1004, proxy server 1028 (and/or any of the respective components thereof), and/or flowcharts 300, 400, 600, 800, 900, 1100, and/or 1200, and/or further embodiments described herein.

A user may enter commands and information into computing device 1300 through input devices such as keyboard 1338 and pointing device 1340. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1302 through a serial port interface 1342 that is coupled to bus 1306, but may be connected by other interfaces, such as a parallel port, game port, or a universal serial bus (USB).

A display screen 1344 is also connected to bus 1306 via an interface, such as a video adapter 1346. Display screen 1344 may be external to or incorporated in computing device 1300. Display screen 1344 may display information, as well as being a user interface for receiving user commands and/or other information (e.g., by touch, finger gestures, virtual keyboard, etc.). In addition to display screen 1344, computing device 1300 may include other peripheral output devices (not shown) such as speakers and printers.

Computing device 1300 is connected to a network 1348 (e.g., the Internet) through an adaptor or network interface 1350, a modem 1352, or other means for establishing communications over the network. Modem 1352, which may be internal or external, may be connected to bus 1306 via serial port interface 1342, as shown in FIG. 13, or may be connected to bus 1306 using another interface type, including a parallel interface.

As used herein, the terms "computer program medium," "computer-readable medium," and "computer-readable storage medium" are used to refer to physical hardware media such as the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1332 and other programs 1334) may be stored on the hard disk, magnetic disk, optical disk, ROM, RAM, or other hardware storage medium. Such computer programs may also be received via network interface 1350, serial port interface 1342, or any other interface type. Such computer programs, when executed or loaded by an application, enable computing device 1300 to implement features of embodiments discussed herein. Accordingly, such computer programs represent controllers of the computing device 1300.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A method implemented by one or more components of a browser application is described herein. The method comprises: providing a request for a first resource to a web server located at a first uniform resource identifier; receiving a response comprising the first resource from the web server, the response specifying a second uniform resource identifier at which a second resource on which the first resource depends is located; modifying the response to specify a header that causes the browser application to generate a report comprising at least the first uniform resource identifier and the second uniform resource identifier; and providing a message comprising the report to a reporting server, the reporting server configured to perform a malware analysis with respect to at least one of the first resource or the second resource.

In one embodiment of the foregoing method, the at least one of the first resource or the second resource comprises: a script; a cascading style sheet; an image; a web worker; an applet; an audio file; or a video file.

In one embodiment of the foregoing method, the header is a content-security-policy-report-only header.

In one embodiment of the foregoing method, said modifying the response comprises: modifying the response in response to determining that the response does not include the header.

In one embodiment of the foregoing method, the method further comprises: providing a second request for the second resource to a second web server located at the second uniform resource identifier; receiving a second response comprising the second resource from the second web server, the second response specifying a third uniform resource identifier at which a third resource on which the second resource depends is located; modifying the second response to specify a second header that causes the browser application to generate a second report comprising at least the second uniform resource identifier and the third uniform resource identifier; and providing a second message comprising the second report to the reporting server, the reporting server being further configured to determine a chain of dependencies between the first resource, the second resource, and the third resource.

In one embodiment of the foregoing method, said modifying the second response is performed by a browser extension of a browser application.

In one embodiment of the foregoing method, the message is a hypertext transfer protocol POST request.

A proxy server communicatively coupled to a web server and a client device, the client device configured to execute a browser application, is also described herein. The proxy server comprises: at least one processor circuit; and at least one memory that stores program code configured to be executed by the at least one processor circuit, the program code comprising: a web server interface configured to: provide a request originating from the browser application executing on the client device to a web server located at a first uniform resource identifier; and receive a response comprising the first resource from the web server, the response specifying a second uniform resource identifier at which a second resource on which the first resource depends is located; a response modifier configured to: modify the response to specify a header that instructs the browser application to generate a report comprising at least the first uniform resource identifier and the second uniform resource identifier and causes the browser application to provide a message comprising the report to a reporting server configured to perform a malware analysis with respect to at least one of the first resource or the second resource; and a client interface configured to: provide the modified response to the browser application.

In one embodiment of the foregoing proxy server, the at least one of the first resource or the second resource comprises: a script; a cascading style sheet; an image; a web worker; an applet; an audio file; or a video file.

In one embodiment of the foregoing proxy server, the header is a content-security-policy-report-only header.

In one embodiment of the foregoing proxy server, the response modifier is configured to modify the response in response to a determination that the response does not include the header.

In one embodiment of the foregoing proxy server, the web server interface is further configured to: provide a second request originating from the browser application for the second resource to a second web server located at the second uniform resource identifier; and receive a second response comprising the second resource from the second web server, the second response specifying a third uniform resource identifier at which a third resource on which the second resource depends is located; the response modifier is further configured to: modify the second response to specify a second header that instructs the browser application to generate a second report comprising at least the second uniform resource identifier and the third uniform resource identifier and causes the browser application to provide a second message comprising the second report to the reporting server, the reporting server further configured to determine a chain of dependencies between the first resource, the second resource, and the third resource; and the client interface is further configured to: provide the modified second response to the browser application.

In one embodiment of the foregoing proxy server, the message is a hypertext transfer protocol POST request.

A method performed by a reporting server is further described herein. The method comprises: generating a database that associates a web application with a plurality of resources that are loaded for the web application on a plurality of client devices, the database generated based on content security policy-based data provided by a plurality of different browser applications each executing on a respective client device of a plurality of client devices; performing an analysis with respect to the plurality of resources for the web application; determining that at least one resource of the plurality of resources comprises malware based on said analysis; and updating a content security policy utilized by the plurality of client devices that causes the plurality of client devices to perform an action to mitigate the malware.

In one embodiment of the foregoing method, said generating further comprises generating a signature for each of the plurality of resources for the web application and associating each signature with its respective resource in the database, said performing the analysis comprises comparing each generated signature to an allow list of valid signatures, and said determining that the at least one resource comprises malware based on said analysis comprises determining that the at least one resource comprises malware responsive to at least determining that the signature generated for the at least one resource is not included in the allow list of valid signatures.

In one embodiment of the foregoing method, the method further comprises: responsive to determining that the signature generated for the at least one resource is not included in the allow list of valid signatures, determining a number of times the at least one resource is loaded with respect to the plurality of client devices; comparing the number to a predetermined threshold; and determining that the at least one resource comprises malware responsive to determining that the number exceeds the predetermined threshold.

In one embodiment of the foregoing method, the database further specifies a respective uniform resource identifier at which each resource of the plurality of resources for each web application is located, said performing the analysis comprises: comparing each respective uniform resource identifier to a deny list of uniform resource identifiers, and said determining that the at least one resource comprises malware comprises: determining that the at least one resource comprises malware responsive to determining that a respective uniform resource identifier is included in the deny list of uniform resource identifiers.

In one embodiment of the foregoing method, the database further specifies a respective version number for each resource of the plurality of resources, each respective version number being specified by content security policy-based data provided by the plurality of different browser applications, said performing the analysis comprises: comparing each respective version number to an allow list of version numbers; and said determining that the at least one resource comprises malware comprises: determining that the at least one resource comprises malware responsive to determining that a respective version number is not included in the allow list of version numbers.

In one embodiment of the foregoing method, the action performed to mitigate the malware comprises: blocking the retrieval of a resource of the plurality of resources that is determined to comprise malware.

In one embodiment of the foregoing method, each of the plurality of resources comprises: a script; a cascading style sheet; an image; a web worker; an applet; an audio file; or a video file.

V. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A method implemented by one or more components of a browser application, comprising:
   providing a request for a first resource to a web server located at a first uniform resource identifier;
   receiving a response comprising the first resource from the web server, the response specifying a second uniform resource identifier at which a second resource on which the first resource depends is located;
   modifying the response to specify a header that causes the browser application to generate a report comprising at least the first uniform resource identifier and the second uniform resource identifier; and
   providing a message comprising the report to a reporting server, causing the reporting server to determine a chain of dependencies comprising the first and second resource and to perform a malware analysis with respect to the first resource and the second resource based on the chain of dependencies.

2. The method of claim 1, wherein the at least one of the first resource or the second resource comprises:
   a script;
   a cascading style sheet;
   an image;
   a web worker;
   an applet;
   an audio file; or
   a video file.

3. The method of claim 1, wherein the header is a content-security-policy-report-only header.

4. The method of claim 1, wherein said modifying the response comprises:
   modifying the response in response to determining that the response does not include the header.

5. The method of claim 1, further comprising:
   providing a second request for the second resource to a second web server located at the second uniform resource identifier;
   receiving a second response comprising the second resource from the second web server, the second response specifying a third uniform resource identifier at which a third resource on which the second resource depends is located;

modifying the second response to specify a second header that causes the browser application to generate a second report comprising at least the second uniform resource identifier and the third uniform resource identifier; and providing a second message comprising the second report to the reporting server, the reporting server being further configured to determine the chain of dependencies comprises the third resource.

6. The method of claim 5, wherein said modifying the second response is performed by a browser extension of a browser application.

7. The method of claim 1, wherein the message is a hypertext transfer protocol POST request.

8. A proxy server communicatively coupled to a web server and a client device, the client device configured to execute a browser application, the proxy server comprising:

at least one processor circuit;

at least one memory that stores program code configured to be executed by the at least one processor circuit, the program code comprising:

a web server interface configured to:

provide a request originating from the browser application executing on the client device to a web server located at a first uniform resource identifier; and receive a response comprising the first resource from the web server, the response specifying a second uniform resource identifier at which a second resource on which the first resource depends is located;

a response modifier configured to:

modify the response to specify a header that instructs the browser application to generate a report comprising at least the first uniform resource identifier and the second uniform resource identifier and causes the browser application to provide a message comprising the report to a reporting server, which causes the reporting server to determine a chain of dependencies comprising the first and second resource and to perform a malware analysis with respect to the first resource and the second resource based on the chain of dependencies; and a client interface configured to:

provide the message to the browser application.

9. The proxy server of claim 8, wherein the at least one of the first resource or the second resource comprises:

a script;
a cascading style sheet;
an image;
a web worker;
an applet;
an audio file; or
a video file.

10. The proxy server of claim 8, wherein the header is a content-security-policy-report-only header.

11. The proxy server of claim 8, wherein the response modifier is configured to modify the response in response to a determination that the response does not include the header.

12. The proxy server of claim 8, wherein the web server interface is further configured to:

provide a second request originating from the browser application for the second resource to a second web server located at the second uniform resource identifier; and receive a second response comprising the second resource from the second web server, the second response specifying a third uniform resource identifier at which a third resource on which the second resource depends is located; and wherein the response modifier is further configured to:

modify the second response to specify a second header that instructs the browser application to generate a second report comprising at least the second uniform resource identifier and the third uniform resource identifier and causes the browser application to provide a second message comprising the second report to the reporting server, the reporting server further configured to determine the chain of dependencies comprises the third resource; and the client interface is further configured to:

provide the modified second response to the browser application.

13. The proxy server of claim 8, wherein the message is a hypertext transfer protocol POST request.

14. A computer-readable storage medium having program instructions recorded thereon that, when executed by a processor of a computing device, performs a method comprising:

providing a request for a first resource to a web server located at a first uniform resource identifier;

receiving a response comprising the first resource from the web server, the response specifying a second uniform resource identifier at which a second resource on which the first resource depends is located;

modifying the response to specify a header that causes a browser application to generate a report comprising at least the first uniform resource identifier and the second uniform resource identifier; and providing a message comprising the report to a reporting server, causing the reporting server to determine a chain of dependencies comprising the first and second resource and to perform a malware analysis with respect to the first resource and the second resource based on the chain of dependencies.

15. The computer-readable storage medium of claim 14, wherein the at least one of the first resource or the second resource comprises:

a script;
a cascading style sheet;
an image;
a web worker;
an applet;
an audio file; or
a video file.

16. The computer-readable storage medium of claim 14, wherein the header is a content-security-policy-report-only header.

17. The computer-readable storage medium of claim 14, wherein said modifying the response comprises:

modifying the response in response to determining that the response does not include the header.

18. The computer-readable storage medium of claim 14, further comprising:

providing a second request for the second resource to a second web server located at the second uniform resource identifier;

receiving a second response comprising the second resource from the second web server, the second response specifying a third uniform resource identifier at which a third resource on which the second resource depends is located;

modifying the second response to specify a second header that causes the browser application to generate a second report comprising at least the second uniform resource identifier and the third uniform resource identifier; and providing a second message comprising the second report to the reporting server, the reporting server being further configured to determine the chain of dependencies comprises the third resource.

19. The computer-readable storage medium of claim 18, wherein said modifying the second response is performed by a browser extension of a browser application.

20. The computer-readable storage medium of claim 14, wherein the message is a hypertext transfer protocol POST request.

* * * * *